(12) United States Patent
Michael et al.

(10) Patent No.: US 11,992,853 B2
(45) Date of Patent: May 28, 2024

(54) SPRINKLER NOZZLE SPRAY WIDTH INDICATOR APPARATUS AND METHOD

(71) Applicant: Melnor, Inc., Winchester, VA (US)

(72) Inventors: Vicky Ann Michael, Winchester, VA (US); Mark Tanner, Fairfax, VA (US); John Cataldo, Winchester, VA (US); Thomas Murray, Philadelphia, PA (US); Christopher Murray, Philadelphia, PA (US); Breanna Stachowski, Elma, NY (US); Jason Zerweck, Media, PA (US)

(73) Assignee: Melnor, Inc.

( * ) Notice: Subject to any disclaimer, the term of this patent is extended or adjusted under 35 U.S.C. 154(b) by 216 days.

(21) Appl. No.: 17/389,924

(22) Filed: Jul. 30, 2021

(65) Prior Publication Data
US 2022/0032327 A1  Feb. 3, 2022

Related U.S. Application Data

(60) Provisional application No. 63/183,964, filed on May 4, 2021, provisional application No. 63/058,498, filed on Jul. 30, 2020.

(51) Int. Cl.
*B05B 3/02* (2006.01)
*B05B 3/12* (2006.01)
(Continued)

(52) U.S. Cl.
CPC ............... *B05B 3/021* (2013.01); *B05B 3/12* (2013.01); *B05B 3/16* (2013.01); *B05B 12/004* (2013.01); *B05B 15/625* (2018.02); *G01B 11/26* (2013.01)

(58) Field of Classification Search
CPC .. B05B 3/021; B05B 3/12; B05B 3/14; B05B 3/16; B05B 15/625; B05B 12/004
(Continued)

(56) References Cited

U.S. PATENT DOCUMENTS 5,645,218 A * 7/1997 Heren ............... B05B 3/044
239/242
6,135,356 A   10/2000 Mitzlaff et al.
(Continued)

FOREIGN PATENT DOCUMENTS

EP    0826427 A2   3/1998

OTHER PUBLICATIONS

PCT Search Report, PCT/US2021/043953, mailed Dec. 15, 2021 (2 pages).
(Continued)

*Primary Examiner* — Cody J Lieuwen
(74) *Attorney, Agent, or Firm* — HEA Law PLLC; Darrin A. Auito

(57) ABSTRACT

According to some embodiments, an oscillating sprinkler system is provided that includes: a central tubular portion having at least one row of flexible nozzles; a cam plate located inside a peripheral wall of said central tubular member, said cam plate having a plurality of cam slots for adjusting positions of said flexible nozzles upon rotation of said cam plate within said peripheral wall; and said peripheral wall including a window via which an edge of said cam plate is observable during rotation of said cam plate such as to designate an extent of angular displacement of the nozzles based on the positioning of the cam plate within the window.

16 Claims, 20 Drawing Sheets

(51) Int. Cl.
  *B05B 3/16* (2006.01)
  *B05B 12/00* (2018.01)
  *B05B 15/625* (2018.01)
  *G01B 11/26* (2006.01)

(58) Field of Classification Search
  USPC .................................................. 239/73, 242
  See application file for complete search history.

(56) References Cited

U.S. PATENT DOCUMENTS

| | | | |
|---|---|---|---|
| 7,607,590 B2 * | 10/2009 | Nies ........................ | B05B 3/044 |
| | | | 239/242 |
| 2010/0078501 A1 | 4/2010 | Miller et al. | |
| 2011/0248102 A1 * | 10/2011 | Wang ...................... | B05B 15/68 |
| | | | 239/562 |
| 2015/0034737 A1 * | 2/2015 | Su .......................... | B05B 15/625 |
| | | | 239/242 |
| 2020/0230627 A1 * | 7/2020 | Chen ........................ | B05B 3/16 |

OTHER PUBLICATIONS

PCT Written Opinion, PCT/US21/43953, mailed Dec. 15, 2021 (5 pages).

\* cited by examiner

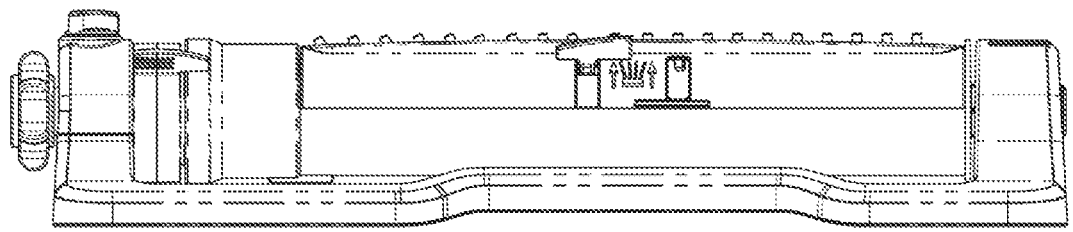
Fig. 2C
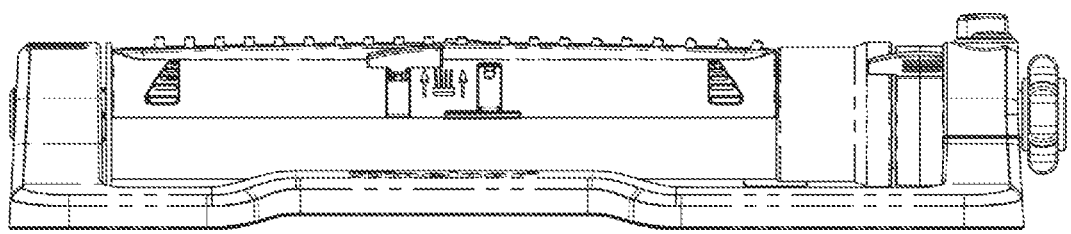
Fig. 2D
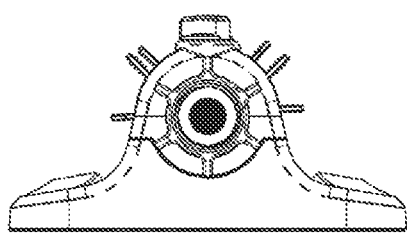 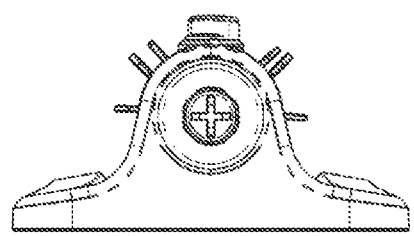
Fig. 2E          Fig. 2F $\theta_1 > \theta_2 > \theta_3 > \theta_4 > \theta_5 > \theta_6 > \theta_7 > \theta_8$

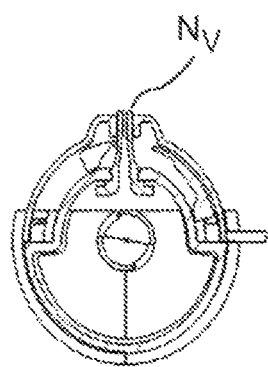 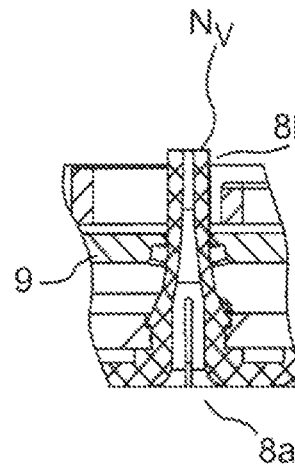 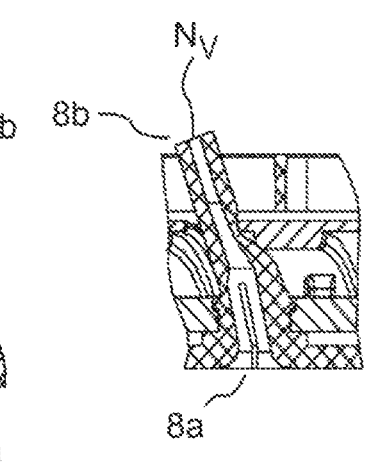
Fig. 13A  Fig. 13B  Fig. 13C
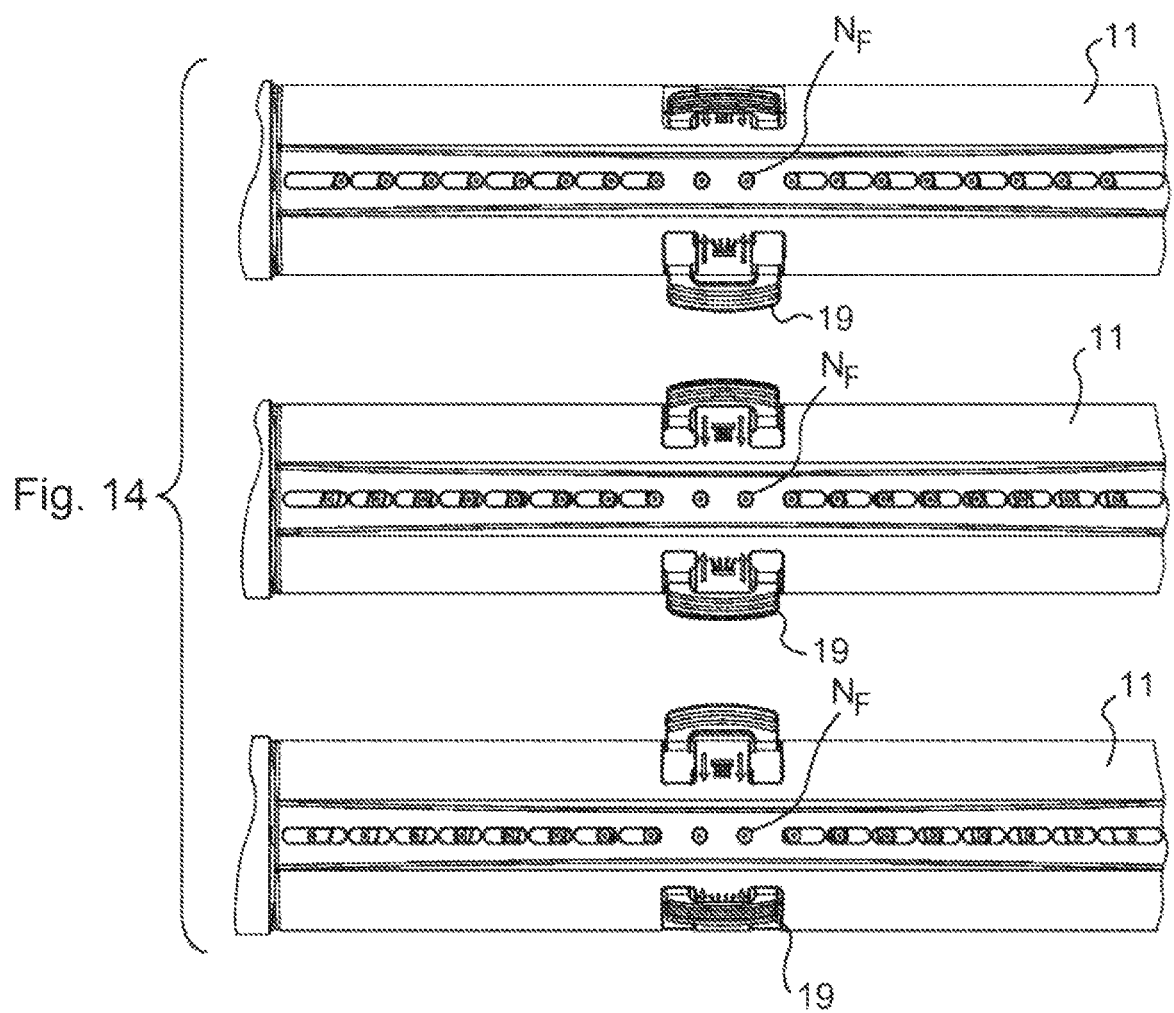
Fig. 14

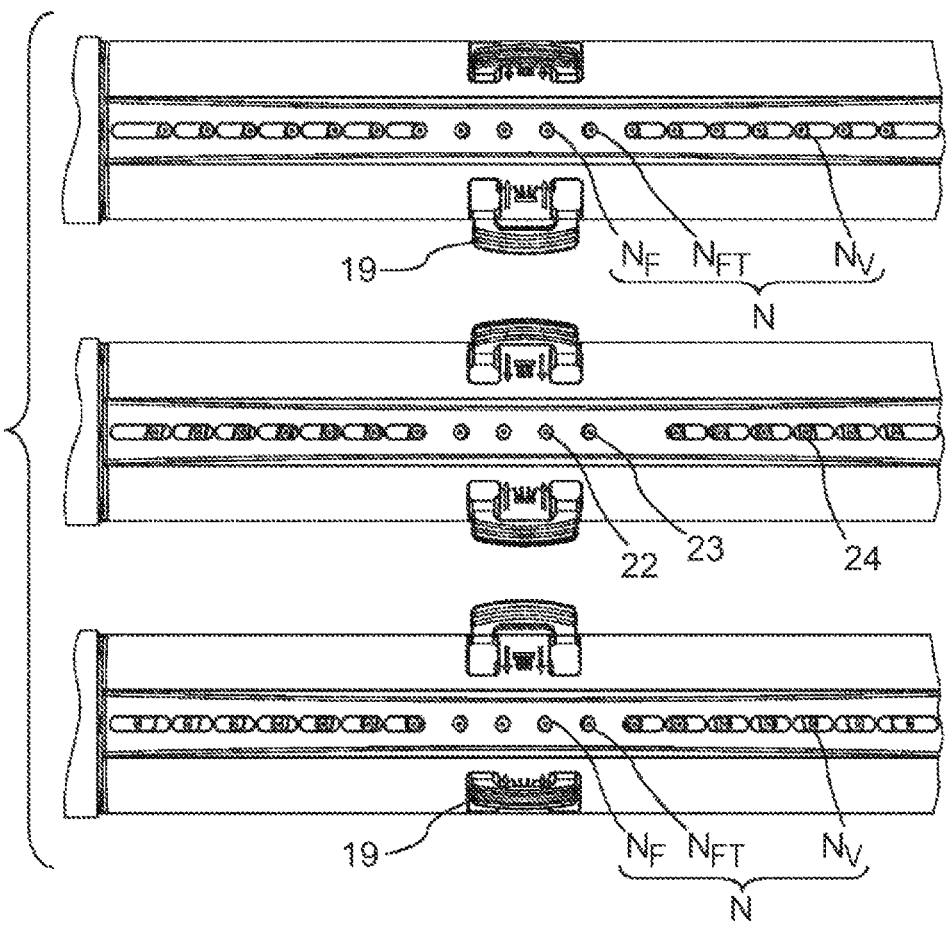

SPRINKLER NOZZLE SPRAY WIDTH INDICATOR APPARATUS AND METHOD

REFERENCES TO THE RELATED PATENT APPLICATION

The present application claims benefit of U.S. Provisional Application No. 63/058,498 filed on Jul. 30, 2020 and 63/183,964 filed on May 4, 2021.

TECHNICAL FIELD

This application relates to the field of sprinklers, more particularly to oscillating sprinklers.

BACKGROUND

Water sprinklers are commonly used to deliver water to a desired spray area. Water sprinklers come in many forms, including stationary, rotary, and oscillating water sprinklers.

Many kinds of oscillating sprinklers are currently on the market. Such sprinklers generally comprise a base frame, oscillator, and a tubular element containing a plurality of holes through which water is discharged. The oscillator drives the tubular element to oscillate back and forth, thereby watering a desired area of lawn. Furthermore, the oscillatory angle of such sprinklers is often adjustable, providing a way for varying the sprinkling area in the vertical direction. Thus, the area of lawn to be watered can be tailored to some extent.

U.S. Pat. No. 6,135,356 ("the '356 patent") describes a conventional oscillating sprinkler, wherein nozzles may be adjusted through two independent levers to achieve a desired coverage pattern, so that when each lever is individually adjusted, the angle of some nozzles, with respect to other nozzles, changes.

Conventional sprinkler designs such as the '356 patent, include a slotted shiftable guide body with a plurality of slots to adjust flexible nozzles, where the slots remain parallel with each other and each slot faces in the same direction. The slotted guide body is shiftable transversely relative to an associated nozzle row and adjusted by multiple levers.

One problem with the conventional design described above is that adjusting the two levers to obtain the desired spray coverage can be cumbersome and tedious. Also, the conventional design utilizes multiple adjusting mechanisms, which lead to more parts, thereby increasing both the complexity of the design, and the manufacturing and assembling costs associated with the design.

Another problem with the conventional design described above is that it a user cannot accurately tell which position the nozzles are set, especially when viewing the sprinkler from a distance. Users would have to determine position based on experience/feel, view of slightly visible bend of outwardly protruding nozzle heads (which is almost impossible), or trial and error, e.g., which is not desirable because of inefficiencies and/or watering unwanted space such as windows or people.

Thus, a need was felt for a sprinkler which can easily and quickly be adjusted to a desired spray width position(s), without requiring complex electronic or digital features.

The present disclosure describes a watering sprinkler, which is easily adjustable into different water-outgoing angles/spray positions to achieve a variety of sprinkling patterns, and includes a window for easily determining the spray position(s) of the sprinkler in both on and off conditions.

Various embodiments of the present disclosure relate to an oscillating sprinkler system with an adjustable spray width. In some embodiments, the present invention provides an improvement over existing systems such as, e.g., found in U.S. Pat. No. 7,607,590 ("the '590 patent"), entitled Oscillating Sprinkler with Adjustable Spray Width, of the present applicant, the entire disclosure of which is herein incorporated by reference. In the event of inconsistent usages between this disclosure and the document incorporated by reference, the usage in the incorporated reference should be considered supplementary to that of this document; for irreconcilable inconsistencies, the usage in this document controls.

SUMMARY

The designs described in the present disclosure overcome problems in and/or improve upon the above and/or other background art.

According to some embodiments, for example, an oscillating sprinkler system includes: a central tubular portion having at least one row of flexible nozzles; a cam plate located inside a peripheral wall of said central tubular member, said cam plate having a plurality of cam slots for adjusting positions of said flexible nozzles upon rotation of said cam plate within said peripheral wall; and said peripheral wall including a window through which an edge of said cam plate is observable during rotation of said cam plate such as to designate an extent of angular displacement of the nozzles based on the positioning of the cam plate within the window.

In some embodiments, the window is tapered or triangular. In some embodiments, the window is narrowest at an upper end and widest at a lower end of the window. In some embodiments, an upper end of the window extends higher than a lower end of said cam slots during rotation of the cam plate. In some embodiments, at least an upper end of the window is located entirely between adjacent cam slots such that said cam slots do not extend behind said window during rotation of the cam plate. In some embodiments, the window includes a plurality of adjacent slits. In some embodiments, the window includes between 3 to 12 adjacent slits, or, preferably, between 4 to 8 adjacent slits. In some embodiments, the cam plate includes more than one finger engaging member on opposite sides of the cam plate, whereby rotational position of said cam plate can be adjusted in opposite rotational directions by always applying a downward force on one of the finger engaging tabs.

According to some embodiments, an oscillating sprinkler system includes: a central tubular portion having at least one row of flexible nozzles; a cam plate located inside a peripheral wall of said central tubular member, the cam plate having a plurality of cam slots for adjusting positions of the flexible nozzles upon rotation of the cam plate within the peripheral wall; and wherein the cam plate includes more than one finger engaging members on opposite sides of said cam plate, whereby rotational position of the cam plate can be adjusted in opposite rotational directions by always applying a downward force on one of the finger engaging tabs.

In some embodiments, the finger engaging tabs extend outwardly through a peripheral wall in the tubular member from opposite sides of the cam plate. In some embodiments, the finger engaging tabs are located around the periphery of the tubular member between 60 to 200 degrees apart from one another, or, more preferably, between 80 to 180 degrees apart from one another, or, more preferably, between 100 to 160 degrees apart from one another. In some embodiments, the peripheral wall includes a window through which an edge of the cam plate is observable during rotation of the cam plate such as to designate an extent of angular displacement of the nozzles based on the positioning of the cam plate within the window.

According to some embodiments, a sprinkler system may include a nozzle strip having a plurality of flexible variable nozzles and one or more fixed nozzles. The variable nozzles in the nozzle strip may be manipulated by a pivot plate positioned between a tubular housing, which holds the nozzle strip, and a cover. The cover, which is connected to the tubular housing, is designed with openings, may include (i) cover slots accommodating adjustment tabs of adjustment mechanism, (ii) cover grooves accommodating the nozzles of the nozzle strip, and (iii) position indicator (e.g., window) providing viewing window for easily determining the spray position(s) of the sprinkler in both on and off conditions.

The cover may include a position indicator on both sides of the sprinkler in a lengthwise direction, e.g., preferable if using double adjustment mechanism since both sides are independently adjustable, and may include a position indicator on opposing sides in the widthwise direction. The cover may be designed with a single position indicator if attached to a sprinkler without independent control of left and right side spray patterns. The location, size, shape, and number of position indicators may vary according to sprinkler design.

The adjustment mechanism may be designed in a bright color (e.g., yellow) and/or contrast to the sprinkler body to provide maximum visibility of the spray position of the sprinkler.

The position indicator/viewing window is preferably triangular shaped but can be designed in any shape which allows for indication of spray position of the sprinkler from a vertical and/or horizontal viewing distance.

The nozzle strip may be a single piece of flexible material such as rubber, or a rubber like compound. The variable nozzles should be flexible to facilitate movement of the variable nozzle axes to control the spray pattern of the fluid.

The nozzle strip may also be designed so that the axis of any individual nozzle is tilted a predetermined angle according to its distance away from the center of the pivot plate. Manufacturing the nozzles with a designed tilt minimizes resistance when fluid is flowing through the nozzle, especially when the nozzle is adjusted to its maximum degree of tilt.

The nozzle strip may also be designed so that the further any variable nozzle is away from the center of the pivot plate, the more pre-tilted the nozzle is. One advantage to pre-tilting the nozzles in this manner is to ensure that as the nozzles move from their pre-tilted positions, the fluid within the nozzle does not suffer increased resistance due to the bending or kinking of the individual nozzle. This is especially true of the most outer nozzles as they move the most.

The pivot plate has a radius which allows it to fit with the radius of the outside diameter of the tubular housing. The pivot plate also contains a plurality of apertures (such as slots or grooves) in which the individual nozzles fit and protrude or extend through.

Each of the grooves of the pivot plate may progressively flare outwards. For example, the groove or grooves closest to the center of the pivot plate may be substantially perpendicular to the longitudinal axis of the pivot plate and the adjacent grooves may be progressively less perpendicular (flare outward) to the longitudinal axis of the pivot plate, as the grooves get further from the center of the pivot plate.

One advantage to flaring the grooves as they get further away from the center of the pivot plate is to produce a fan-like pattern of fluid coverage. In other words, each of the variable nozzles may move relative to one another so that, when adjusted, an outer variable nozzle will move in an outward direction more than an inner variable nozzle. As such, the coverage pattern of the water will be uniform and consistent, leaving no large gaps in the area covered.

The sprinkler system may include a wedge and notch design so that the pivot plate may be more easily moved into any of a number of fixed positions. The different fixed positions result in different spray patterns of the variable nozzles. On the bottom side of the pivot plate is located a small wedge. This wedge contacts and moves over a semicircular notch-shaped element. The wedge may be held in place in by a notch, but may also be moved with the application of the requisite force. The wedge and notch settings allow for a consistent and repeatable spray pattern to be set by the user. The features and advantages described above, as well as others, will become more readily apparent to those of ordinary skill in the art by reference to the following detailed description and accompanying drawings. While it would be desirable to provide a sprinkler that provides one or more of the foregoing or other advantageous features as may be apparent to those reviewing this disclosure, the teachings disclosed herein extend to those embodiments which fall within the scope of patent claims, regardless of whether they accomplish one or more of these advantages or include one or more of these advantageous features.

BRIEF DESCRIPTION OF THE DRAWINGS

The present invention is illustrated by way of example and not limited in the figures of the accompanying drawings in which like references indicate similar elements.

FIGS. 1A-1G illustrate a sprinkler according to one embodiment of the present disclosure, wherein FIG. 1A is a top plan view of the sprinkler, FIG. 1B is a perspective view of the sprinkler (shown from an upper front right side of the sprinkler shown in FIG. 1A), FIG. 1C is a rear view of the sprinkler; FIG. 1D is a front view of the sprinkler, FIG. 1E is a right-side view of the sprinkler, FIG. 1F is a left side view of the sprinkler, and FIG. 1G is a bottom view of the sprinkler.

FIGS. 2A-2G illustrate a sprinkler according to another embodiment of the present disclosure, wherein FIG. 2A is a top plan view of the sprinkler, FIG. 2B is a perspective view of the sprinkler (shown from an upper front right side of the sprinkler shown in FIG. 2A), FIG. 2C is a rear view of the sprinkler, FIG. 2D is a front view of the sprinkler, FIG. 2E is a right-side view of the sprinkler, FIG. 2F is a left side view of the sprinkler, and FIG. 2G is a bottom view of the sprinkler.

FIG. 8A shows a first stage, FIG. 8B shows a second stage, FIG. 8C shows a third stage, and FIG. 8D shows a fourth stage.

FIG. 13A show a sectional assembled view along an x-axis and y-axis of the sprinkler shown in FIG. 9A, according to one embodiment, and FIG. 13B and FIG. 13C shows a variable nozzle in a first position and second position, respectively.

FIG. 14 shows an assembled view of several different settings of the sprinkler of FIG. 9A, according to one embodiment.

FIG. 16 shows an assembled view of the different settings of the sprinkler according to another embodiment.

DETAILED DESCRIPTION

Figure 1A:
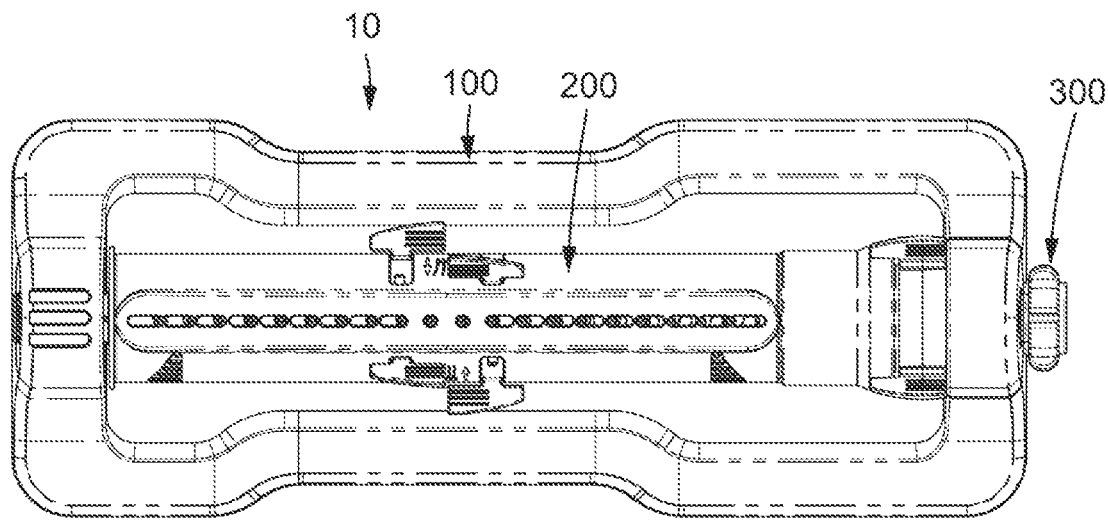
Figure 1B:
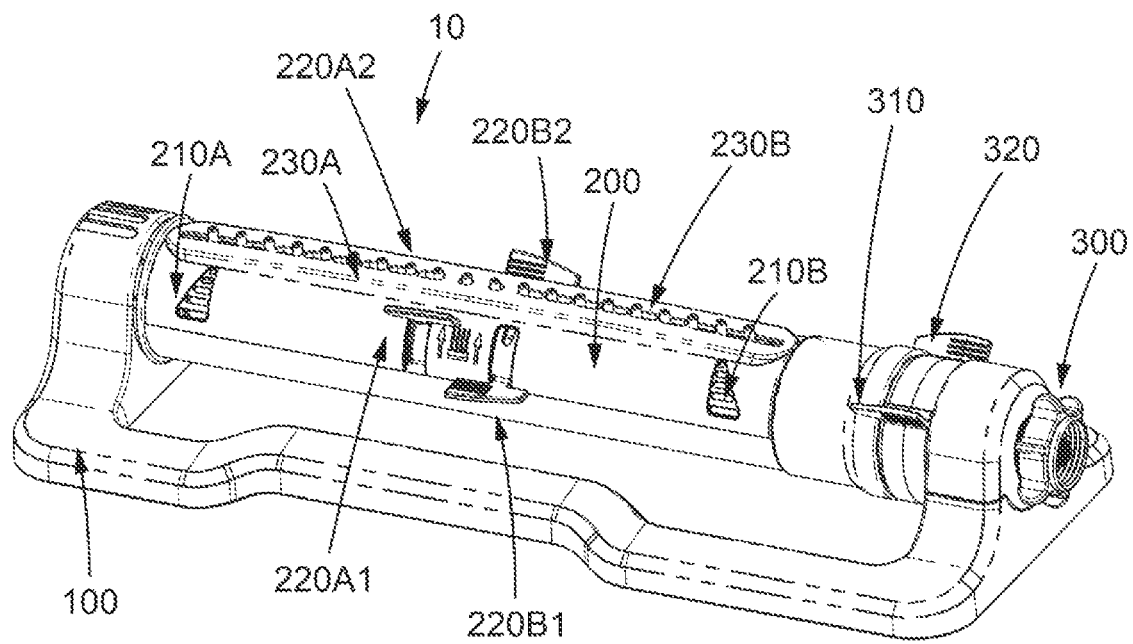
Figure 1C:
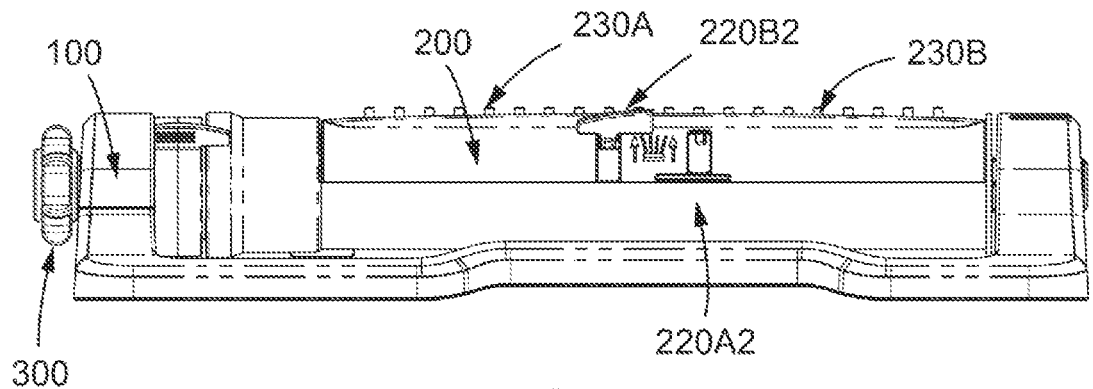
Figure 1D:
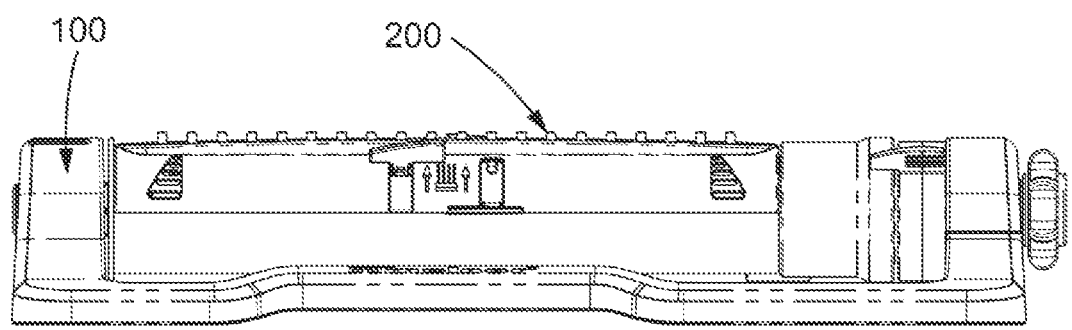
Figures 1E, 1F:
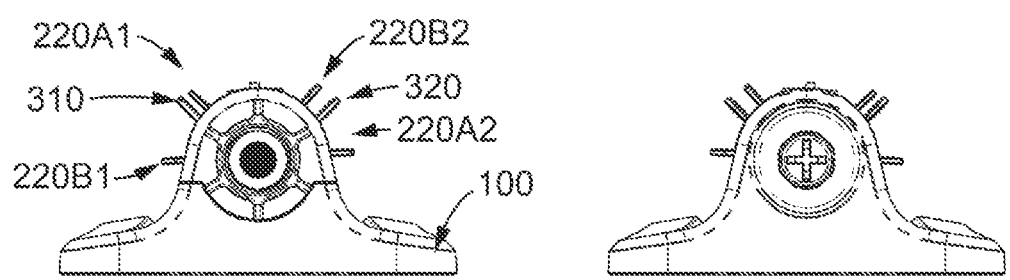
Figure 1G:
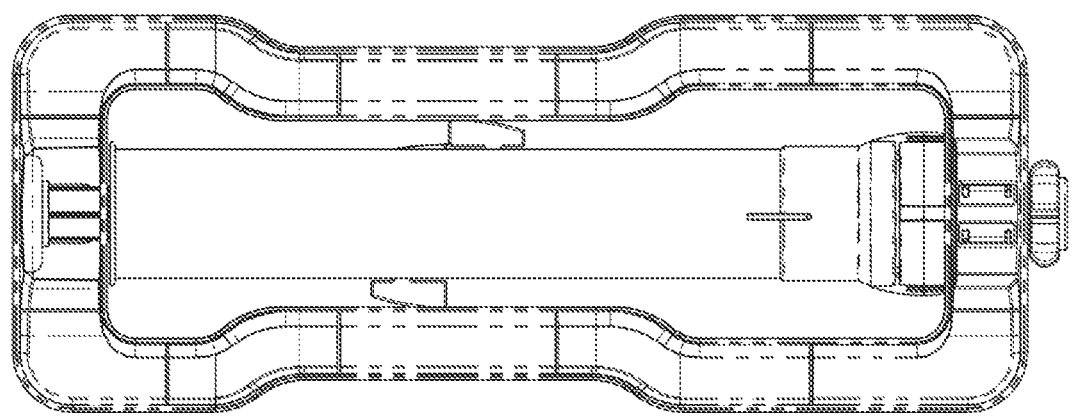
Figure 2A:
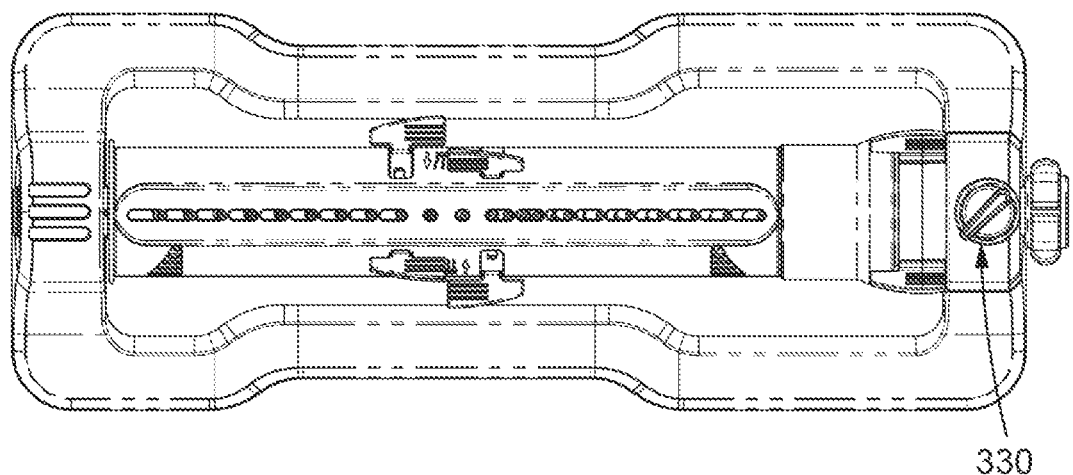
Figure 2B:
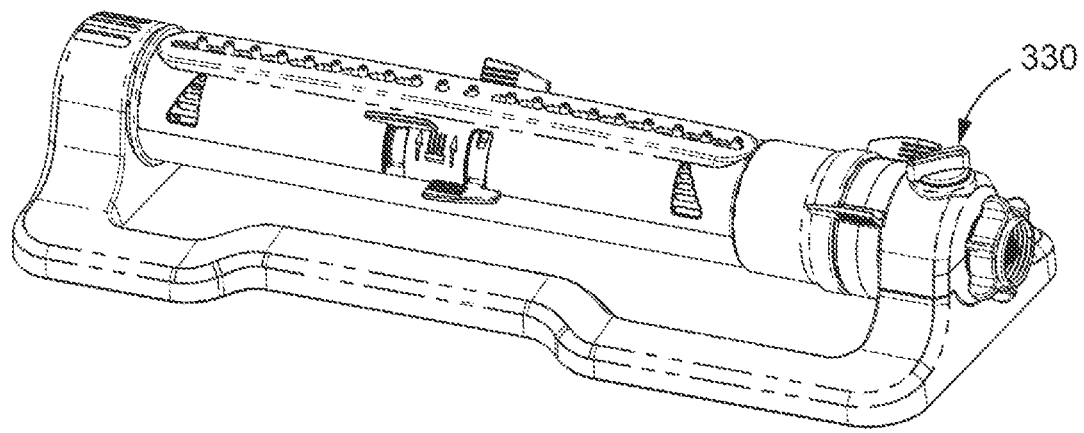
Figure 2G:
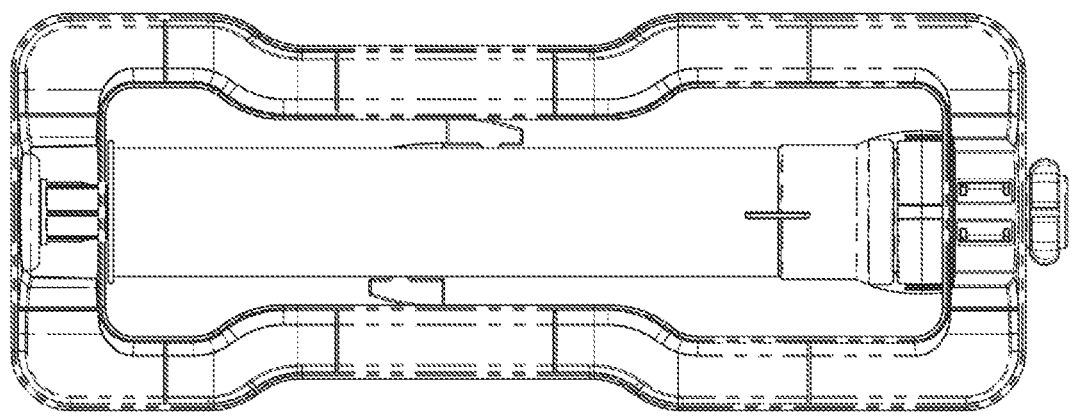

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

With reference to FIGS. 1A-1G, as shown in such embodiments, an oscillating sprinkler 10 is provided that includes a base portion 100 for supporting the sprinkler 10, a central tubular discharging portion 200, and a water inlet portion 300. In use, a water source, such as, e.g., a hose (not shown) is attached to the sprinkler via the water inlet portion 300, and water is directed through a central water supply conduit (not shown) within the center of the central tubular discharge potion 200 and is discharged via a strip or row of flexible nozzles 230 extending via through-holes in an outer sleeve of the tubular discharge portion 200.

In the illustrated embodiments, the row of nozzles 230 includes a first set of nozzles 230A and a second set of nozzles 230B. In the illustrated embodiments, the first set of nozzles 230A is positioned along a first half of the tubular discharge portion 200 (i.e., distal to the inlet portion 300) and the second set of nozzles 230B is positioned along a second half of the tubular discharge portion 200 (i.e., proximate to the inlet portion). Although the illustrated embodiments include two sets of nozzles, in some alternate embodiments, a single set of nozzles can be provided. See, for example, FIG. 9A. Alternatively, in some other embodiments, more than two sets of nozzles can be provided. Not shown.

According to the present design, a novel mechanism is provided for visual representation of the angular adjustment (position) of the first set of nozzles 230A and/or the second set of nozzles 230B. As shown in, e.g., FIG. 1B, in some embodiments, the tubular discharge portion 200 includes at least one gauge window 210 via which a user can visually observe the extent of angular adjustment of the flexible nozzles 230A and/or 230B. For example, a single window 210 is provided for each respective set of nozzles 230. Accordingly, in the illustrated embodiments, which include two sets of nozzles 230A and 230B, two gauge windows are provided—i.e., first gauge window 210A corresponding to the first set of nozzles 230A and second gauge window 210B corresponding to the second set of nozzles 230B.

Figure 6:
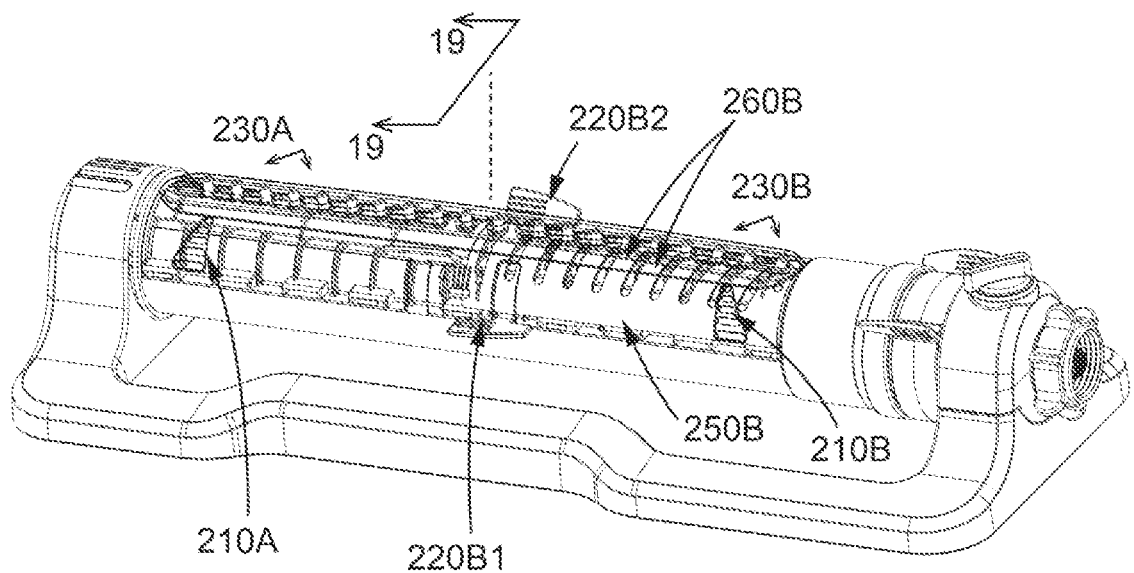
FIG. 6 is an explanatory perspective view of the embodiment shown in FIG. 3 with portions of the outer tubular member shown as translucent to facilitate viewing of internal portions of the device.
Figure 7:
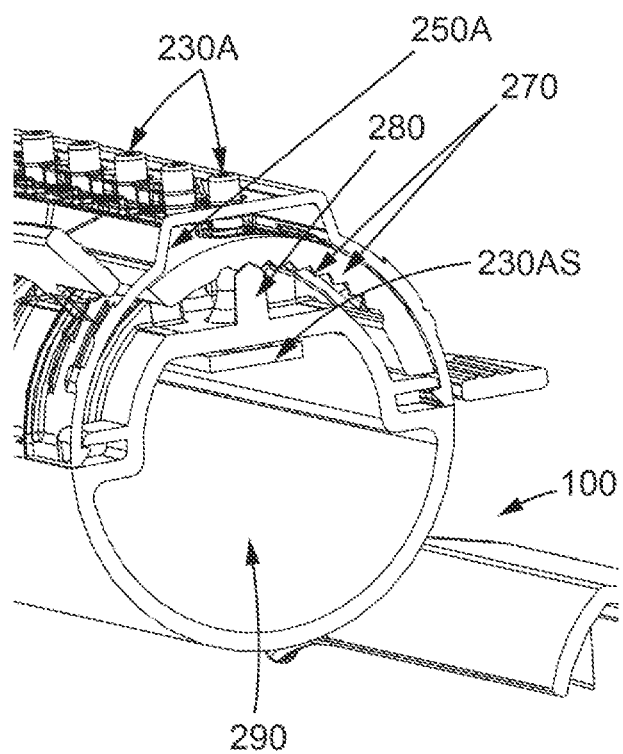
FIG. 7 is an explanatory perspective view of the device shown in FIG. 6 taken along the line 19-19 shown in FIG. 6 with portions of the outer tubular member shown as translucent to facilitate viewing of internal portions of the device.

Although not shown in FIGS. 1A-1G, as shown in FIG. 6 and FIG. 7, the tubular discharge portion 200 includes at least one rotatable cam plate 250 which can rotate around a central axis of the tubular discharge portion 200, and is configured to move a corresponding set of nozzles 230 such as to angularly adjust the position of the nozzles 230 by a camming action of the rotatable cam plate 250.

As shown in, e.g., FIG. 6, for example, two rotatable cam plates 250 (250A and 250B) are provided—i.e., first cam plate 250A arranged to adjust the position of the first set of nozzles 230A and second cam plate 250B arranged to adjust the position of the second set of nozzles 230B.

Figure 5:
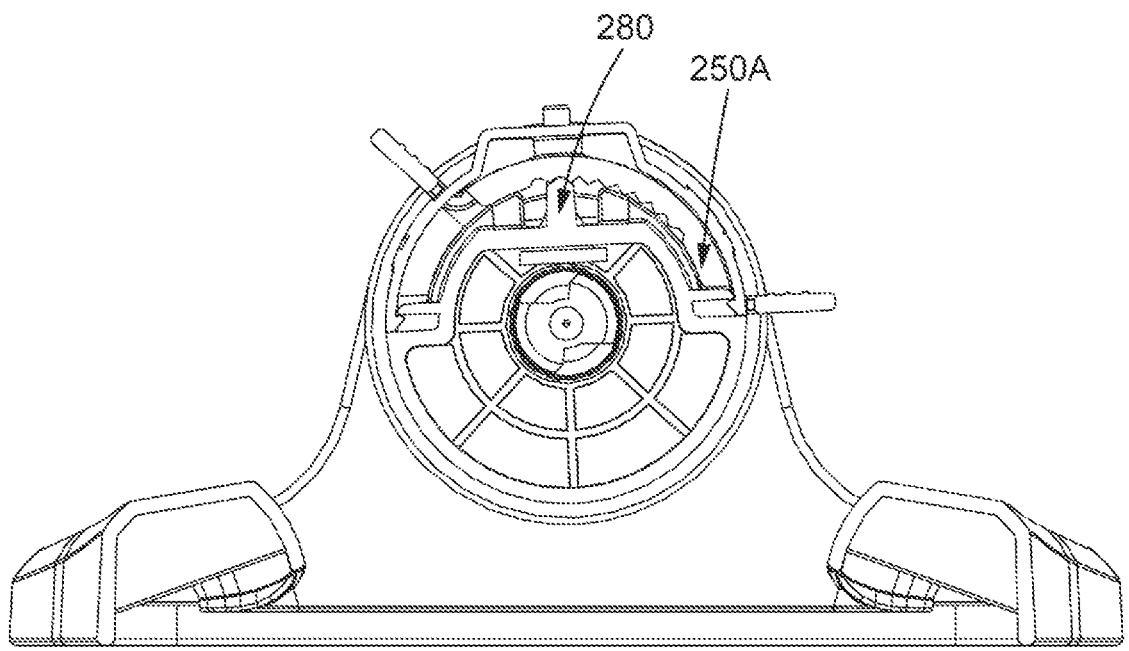
FIG. 5 is a cross-section right side end view taken along the line 19-19 shown in FIG. 6.

The cam plates (e.g., 250A, 250B) shown in FIG. 7, for example, extend around less than ½ of the circumference of the tubular portion 200, such as, e.g., around approximately ⅓ of the tubular portion as shown in, e.g., FIG. 5. As also shown in FIGS. 5-8, the rotatable cam plates (e.g., 250A, 250B) may include a plurality of cam slots 260 (e.g., second cam slots 260B shown formed in the second cam plate 250B) formed therein which extend substantially transverse to the axis of the tubular portion 200. As shown, the cam slots 260 are preferably angled such that changing of the rotational position of the cam plate 250 within the tubular portion 200 will varyingly change the tilting position of the corresponding nozzles 230. The nozzles 230 are preferably flexible, such as, e.g., made with a flexible polymer or rubber to facilitate bending upon pressure from respective cam slots 260 of the cam plate 250.

The cam plates 250 have at least one finger pressing portion 220 (e.g., adjustment tab) for rotating the cam plate 250 within the tubular portion 200. As shown in the figures, each of the cam plates 250 may include two finger pressing portions 220, whereby a user can readily adjust the positioning of the cam plate by pressing "downward" on either side of the sprinkler device 10. Among other things, enabling adjustment by pressing "downwardly" for repositioning facilitates user handling by enabling a user to avoid "lifting" action which could potentially displace the position of the sprinkler—e.g., a downward force can be easier to manage due to the support of the device upon a ground surface.

The finger pressing portion 220 may be integrally formed with the cam plate 250 (e.g., integrally injection molded with or otherwise integrally molded with or otherwise attached to the cam plate). Additionally, the finger pressing portion 220 may be configured to extend outwardly from or proximate to opposite lower sides of the cam plate 250, whereby the forces applied to the cam plate by a user can readily be pressed downwardly towards a ground surface for enhanced stability.

The tubular portion 200 may include an outer peripheral cover plate (e.g., described below) that covers the cam plate(s) 250, except that for each cam plate 250, the tubular portion 200 preferably includes a gauge window 210 via which the position of the cam plate 250 can be observed and, hence, a corresponding position of the respective nozzles can be observed.

As shown in, e.g., FIG. 6, the gauge window 210 is positioned and configured such that a larger extent of the cam plate 250 can be observed within the gauge window 210 when a larger extent of angular positioning is achieved. That is, preferably a larger extent of the cam plate 250 observed through the gauge window 210 will correspond to a large width of angular adjustment of the sprinkler nozzles 230 (e.g., achieving a wider width of sprinkling of the oscillating sprinkler due to increased outward tilting of the corresponding nozzles 230).

Furthermore, as shown in the figures, the window 210 is formed in a substantially tapered or triangular configuration, such as to be narrower towards an upper portion of the window and wider towards a lower portion of the window. Accordingly, as shown in the figures, as the cam plate 250 moves further downwardly behind the gauge window 210, a wider extent of the cam plate 250 is seen in the gauge window 210, e.g., wider in a horizontal direction parallel to the longitudinal direction of the tubular member. Accordingly, the device can be configured such that a wider angular adjustment of the nozzles 230 of the sprinkler 10 can be readily visually depicted by a wider extent shown in the gauge window 210. Alternatively, the gauge window 210 may be designed in other shapes, e.g., rectangle, circle, letter, number, such that the amount or length of the visible portion of the cam plate 250 reflects approximate level or degree of angular adjustment of the nozzles 230 of the sprinkler 10.

Furthermore, as shown in FIG. 6, the gauge window 210 may be configured to extend upwardly along a side of the tubular portion 200 to a height that is greater than a lower end of at least one adjacent cam slot 260. However, the window 210 is preferably configured such that an adjacent cam slot 260 does not extend within the window 210 at any position of the rotational movement of the cam plate 250, e.g., so that the cam plate 250 itself is visible through the gauge window 210. Accordingly, in some embodiments, as shown, an upper portion of the window 210 is configured such as to be narrower than a distance between adjacent cam slots 260B, and such as to extend in between adjacent cam slots 260 when the cam plate 250 is fully extended across the window 210. Furthermore, in some embodiments, the relationship between the window 210 and the cam slots can be substantially as shown in the figures. Towards that end, it should be appreciated that the illustrated figures are generally to scale in some illustrative and non-limiting embodiments.

Furthermore, as illustrated in FIG. 5 and FIG. 7, in some embodiments, to help maintain the positioning of the cam plate 250 within the tubular portion 200, a ratchet mechanism can be provided. For example, in some embodiments, a lower surface of the cam plate can include a plurality of indentations 270 (e.g., grooves or holes) and the interior of the tubular portion 200 can include a tab member 280 arranged to flexibly be received within a corresponding indentation 270 during the rotational motion of the cam plate 250 around the longitudinal axis of the tubular member 200. For example, in some embodiments, the tab member 280 can be a flexible member that is configured to snap into and out of engagement with respective grooves or holes of the indentations 270 during rotation of the cam plate 250. Although the illustrated embodiment includes indentations on the cam plate 250 and a tab on the tubular member 200, it is known that in other embodiments, the cam plate 250 can include a tab member that engages with indentations within the tubular portion 200. Furthermore, in other embodiments, other forms of frictional engagement can be employed to maintain the position of the cam plate 250 at a desired location during use.

Figure 8A:
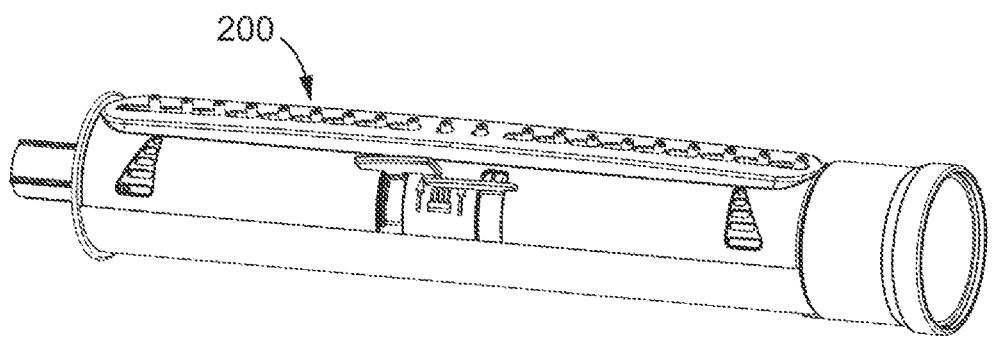
FIGS. 8A-8D are explanatory perspective views of a central tubular portion of the device shown in FIG. 6 showing a plurality of stages of adjustability of the sprinkler device, specifically.
Figure 8B:
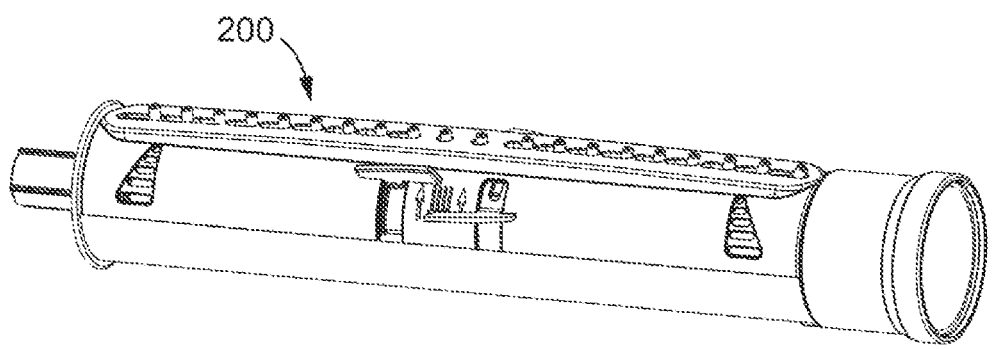
Figure 8C:
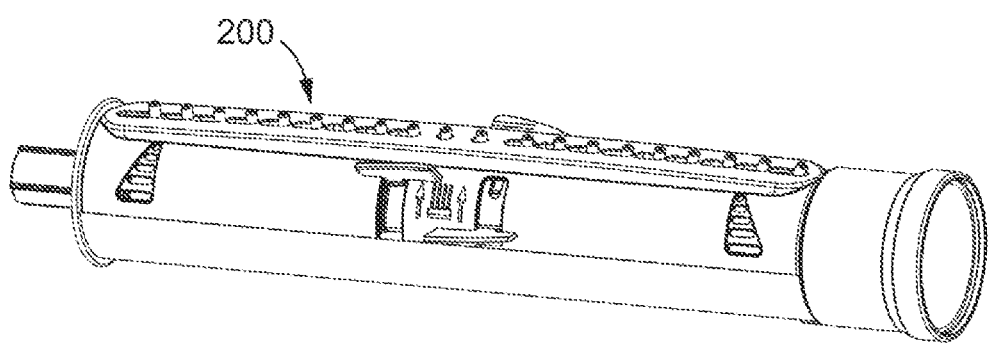
Figure 8D:
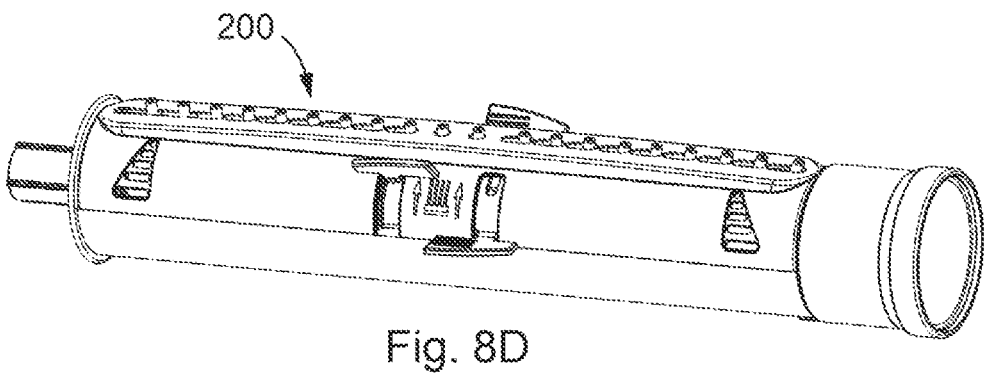

FIGS. 8A-8D show an illustrative tubular member 200 (separated from base portion 100 and central tubular discharging portion 300 of sprinkler 10) in which the rotational position of one of two cam plates (e.g., 250B) is adjusted from a narrow position of FIG. 8A (i.e., the width of the oscillating sprinkler spraying is narrowest), to increasing extents of angular positioning of the corresponding nozzles at increasing amounts from a first increased extent shown in FIG. 8B, to a further increased extent shown in FIG. 8C, to an even further increased extent as shown in FIG. 8D. In this regard, as seen at the right sides of FIGS. 8A-8D, the gauge window (e.g. 210B) displays increasing portions of the cam plate (e.g., 250B) visible therein, which extends both further downwardly in the window and further horizontally in the longitudinal direction of the tubular portion 200.

In the illustrated embodiments, the gauger window 210 is not entirely open but includes a plurality of horizontal openings or slits, with a longest opening or slit at a lower end and a shorter opening or slit at an upper end. In particular, in the illustrated embodiments, five aligned slits are formed in the tubular portion 200. In this manner, the gauge window 210 helps to provide clearer delineation in the extent of adjustment, e.g., five width settings. For example, a user can readily set and visually confirm the adjustment amount at 1, 2, 3, 4 or 5 "bars" or "slots" showing the cam plate there-behind. Although the illustrative embodiment includes 5 such slots, in other embodiments more or less slots or no slots can be provided. However, preferably, the number of slots is between about 3 to 12, and, more preferably, between about 4 to 8. Moreover, in some embodiments, the gauge window 210 does not require any slots but can simply involve an entire opening or window for observation therethrough, e.g., the gauge window 210 is simply an opening through which the cam plate is observed. That is, the window does not require a translucent or clear member covering the window. However, in some embodiments, the gauge window 210 can include a clear cover member, such as, e.g., a clear plastic or glass cover member, e.g., to prevent debris from entering tubular portion 200 of sprinkler 10.

As also shown in the figures, in some embodiments, the cam plate 250 which is configured to be visible at times through the gauge window 210 is a bright color, such as, e.g., yellow in the illustrative embodiment, while the outer wall of the tubular portion 200 having the window 210 is preferably a dark color, such as, e.g., black in the illustrative examples. However, other colors can be employed in other embodiments. However, preferably the contrast between the cam plate 250 observed through the gauge window 210 and the central tubular portion 200 (or member around the periphery of the window or forming the window) is substantial enough to enhance visual observability of the cam plate within the window from a distance, e.g., up to 50 yards away.

As shown in the figures, in some embodiments, levers or knobs 310 and 320 are preferably provided which adjust the rotational extent of the sprinkler during use. That is, during use the row of nozzles will preferably oscillate back and forth and these knobs or levers can be manually adjusted to set desired locations of (i.e., extents of) such oscillations.

The embodiment shown in FIGS. 2A-2G is substantially the same as that of the embodiment shown in FIGS. 1A-1G. However, in this embodiment, the frame or base 100 includes a flow control knob 330 that can be manually rotated to close or open flow of water through the sprinkler.

With reference to FIG. 7, in some embodiments the nozzles 230 can include a plurality of flexible nozzles that are together formed on a single strip 230AS, such as, e.g., a single polymeric or rubber strip and are formed such as to extend from the single strip. As also shown in FIG. 7, in some embodiments, an interior of the tubular portion includes a central flow path or channel 290 via which water enters the tubular portion 200 and is discharged via the respective nozzles which extend from the flow path or channel 290 through to the exterior of the tubular portion 200 as shown in the figures.

Figure 9A:
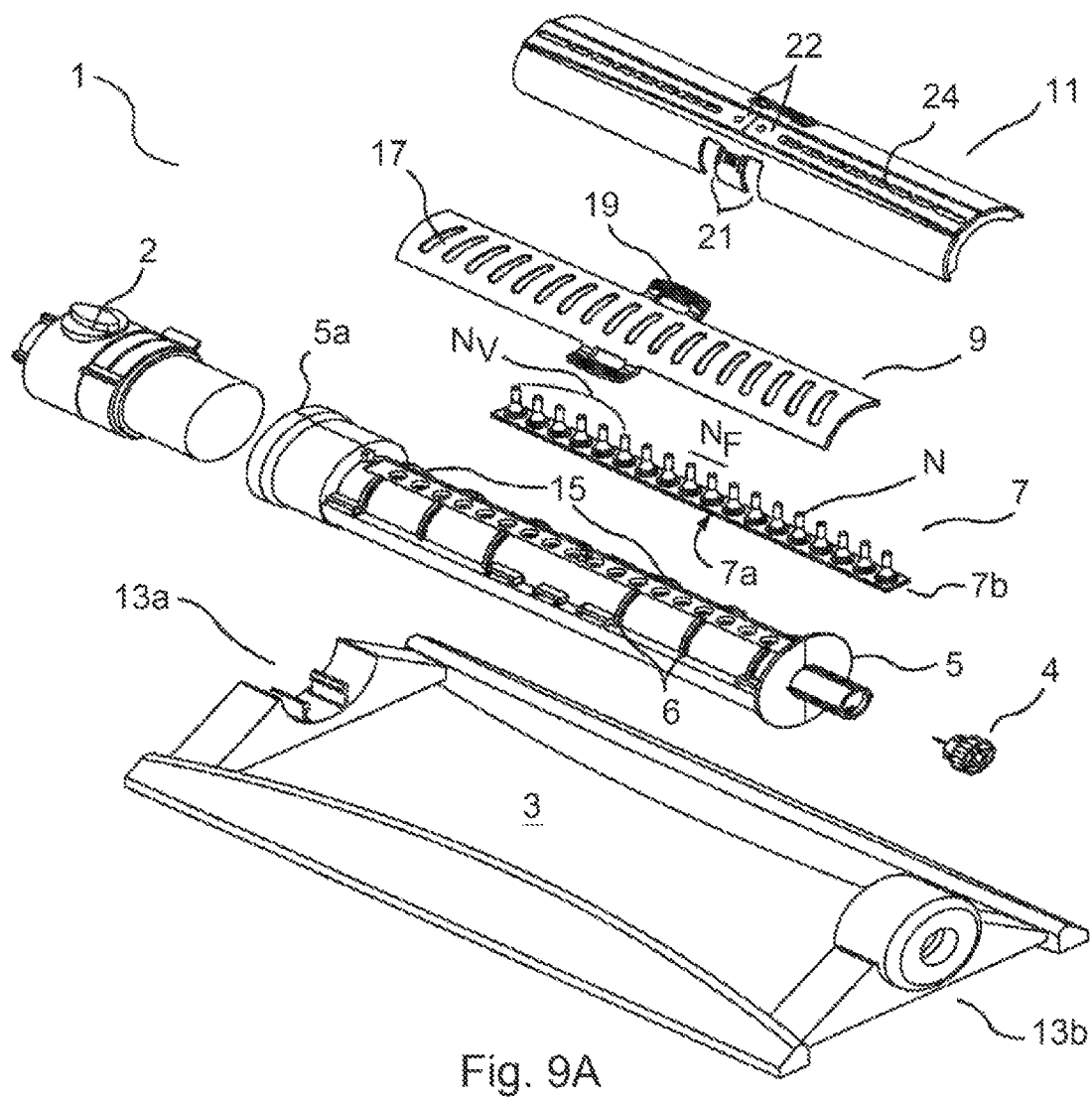
FIG. 9A shows a perspective exploded view of a sprinkler according to one embodiment.

FIG. 9A is a perspective exploded view of an embodiment of sprinkler 1 designed with a single adjustment tab, e.g., flow pattern generally equivalent on the left and right side of the sprinkler. In one embodiment, other than the following features, the sprinkler shown in FIG. 9A may be designed the same as the sprinkler shown in FIGS. 1A-1G, FIGS. 2A-2G and other figures in this disclosure: pivot plate 9, adjustment tab(s) 19, and cover 11. Plus, the sprinkler 1 shown in FIG. 9A could be designed to include position indicator windows (e.g., gauge window 210) as shown in FIGS. 1A-1G, FIGS. 2A-2G, FIG. 9C and other figures in this disclosure. In other words, much of the disclosure described above can be applied to a sprinkler 1 (10) having a single adjustment tab (e.g., FIG. 9A) or multiple adjustment tabs (e.g., FIGS. 1A-1G, FIG. 6).

FIG. 9A shows housing 5 suspended from base frame 3, between a pair of support/connecting members 13 a and 13 b. The housing 5 includes a row of a plurality of inlets 15, which may be straight, provided along a longitudinal axis of housing 5. One end of the housing 5 is connected to the fluid intake portion 2. Another end of the housing 5 is configured to receive plug 4. The housing 5 can be rotated back and forth about the longitudinal axis by a water-operated drive (not described). The housing 5 is operably connected at a near end 5 a to a water carrying device (e.g., hose), via a fluid intake portion 2, wherein water may pass through inlets 15. One or more elevated rib(s) 6 may be formed on the housing 5 and support pivot plate 9. Each of the elevated ribs 6 has a top surface and side surface.

Nozzle strip 7 (e.g., flexible nozzles 230) may be positioned either on top of housing 5 or within housing 5. Nozzle strip 7 may include a row of variable nozzles $N_v$ and one or more fixed nozzles $N_f$, each corresponding with inlets 15 provided on housing 5.

According to one aspect of the present disclosure, nozzle strip 7 includes a plurality of nozzles N, wherein a central nozzle and an adjacent nozzle on one or both sides of the central nozzle are fixed nozzles $N_f$ in an upright position, e.g. approximately 90° from the longitudinal axis. This structure delivers a predetermined vertical projection of water. Each of the remaining nozzles on nozzle strip 7 are variable nozzles $N_v$, each of which may be adjustably tilted outward by contact with a sidewall angle 25 (shown in FIGS. 10A-10D) of pivot plate groove 17 (e.g., cam slot 260) of pivot plate 9 (e.g., cam plate 250) (further described below). Variable nozzles $N_v$ can deliver an outwardly tilted projection of water.

Nozzle strip 7 is a flexible strip (preferably made of rubber), having a plurality of nozzles N projecting upward from nozzle strip 7. When operatively positioned with respect to housing 5 and pivot plate 9, nozzles N near the center of nozzle strip 7 project upward in a substantially vertical direction, while the remaining nozzles toward the outer end 7b of nozzle strip 7 are progressively flared outwards.

Pivot plate 9 is an elongated curved (arcuate) plate having substantially transverse (lateral) grooves 17. Pivot plate 9 moves relative to a substantially fixed cover 11 (e.g., pivots or tilts in a circumferential direction) and has a plurality of pivot plate grooves 17, at least one pivot plate slot 20, and at least one adjusting tab 19, or any other type of appropriate adjusting element.

Pivot plate 9 extends in the longitudinal direction of the sprinkler and has a plurality of pivot plate grooves 17 extending generally transversely across the pivot plate 9. Pivot plate 9 is supported on housing 5 by ribs 6, such that pivot plate 9 is pivotable, back and forth, about housing 5 in a circumferential direction. The plurality of nozzles N, extend upward through pivot plate grooves 17 when pivot plate 9 is in position on housing 5. Cover 11 is attached to housing 5 to cover some of pivot plate 9, such that nozzles N extend into cover outlets 22 in cover 11 to allow water to be outwardly projected from the nozzles N.

The adjusting tab 19 (e.g., finger pressing portion 220) may be formed integrally with the pivot plate 9. Pivot plate 9 may be formed of plastic or any other suitable material. Pivot plate 9 is provided on top of housing 5. The adjusting tab 19 may extend outward from a portion of the pivot plate. Pivot plate 9 is covered by cover 11. The adjusting tab 19 protrudes outward through the cover via corresponding cover slots 21 provided in the cover 11. The corresponding cover slots 21 enable the adjusting tab 19 to travel a predetermined distance. The travel of the adjusting tab 19 determines a displacement of the pivot plate 9.

Figure 9B:
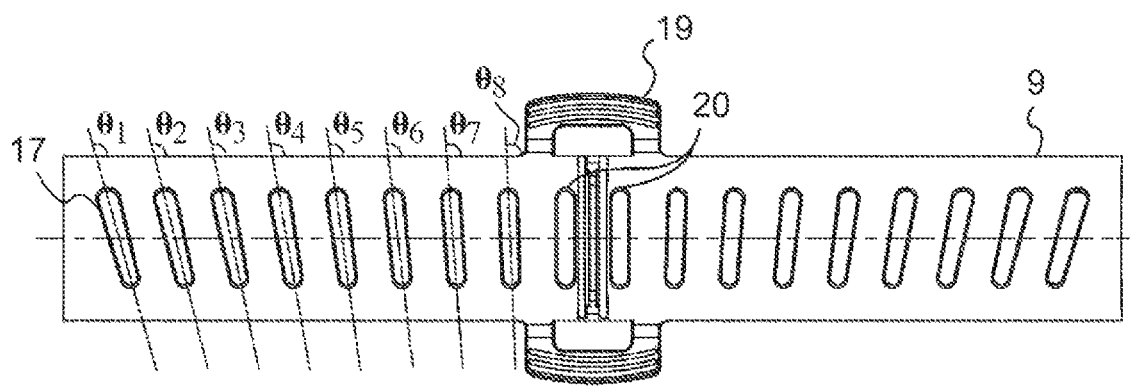
FIG. 9B shows the angles of the groove of the pivot plate of the sprinkler of FIG. 9A.

The number of pivot plate grooves 17 preferably corresponds to the number of variable nozzles $N_v$. Pivot plate grooves 17 are generally oblique to the longitudinal direction of pivot plate 9. Pivot plate slot(s) 20 (as shown in FIG. 9B) corresponds to each fixed nozzle $N_f$ provided in sprinkler 1. However, one slot 20 may also correspond to more than one fixed nozzle $N_f$. A pivot plate slot width or groove width is approximately equal to an external diameter of a nozzle outlet 8 b (shown in FIGS. 13B and 13C). In the assembled state of the sprinkler 1, the fixed vertical nozzle(s) $N_f$ project through the corresponding straight pivot plate slots 20 and the variable nozzles $N_v$ project through the corresponding pivot plate grooves 17.

The cover 11 is attached to the housing 5 and has a circular cover outlet 22 corresponding to each fixed vertical nozzle $N_f$ in the sprinkler 1, a plurality of rectangular cover grooves 24 that are substantially parallel to the longitudinal axis of the sprinkler 1, and cover slots 21 associated with each adjusting tab 19.

In another embodiment, the cover 11 includes at least one gauge window 210 (position indicator) formed in the shape of a viewing window for easily determining the spray position(s) of the sprinkler in both on and off conditions. The gauge window may be a triangular shaped opening formed by a plurality of generally vertically aligned linear cutouts, as shown for example in FIGS. 1A-1G and FIG. 9C. The optimal position and/or size of the viewing window is determined based on the pivot plate 9 design and such that the pivot plate 9 is visible from both vertical and horizontal viewing directions. In this embodiment, e.g., as described for example in reference to FIGS. 8A-8D, each the linear cutout functions as a position indicator of the nozzles, e.g., if the angle openings display all yellow (if the color of the pivot plate is yellow), then it is on the widest setting and if only the top linear cutout opening is yellow (or no yellow is showing) then it is in the upright position.

The cover 11 and the pivot plate 9 are superimposed so that in the assembled state, the nozzles N extend outside the cover 11 and away from the housing of the sprinkler 1. The overlapping of the pivot plate grooves 17 and the cover grooves 24 define an intersection area, which provides a protruding space for the nozzles N. The shape of the pivot plate grooves 17 determines the tilting position of the variable nozzles $N_v$ and therefore the sprinkling pattern.

As shown in FIG. 9B, the pivot plate grooves 17 incrementally become less parallel with the pivot plate slots 20 as the pivot plate grooves 17 get further away from the pivot plate slots 20. This progressive increasing of the difference in the angles of the pivot plate grooves allows for a consistent and uniform sprinkler spray pattern. As the variable nozzles $N_v$ get manipulated by pivot plate grooves 17, the variable nozzles point in a more outward direction the further away the grooves 17 are located from the center of the pivot plate 9.

Figure 9C:
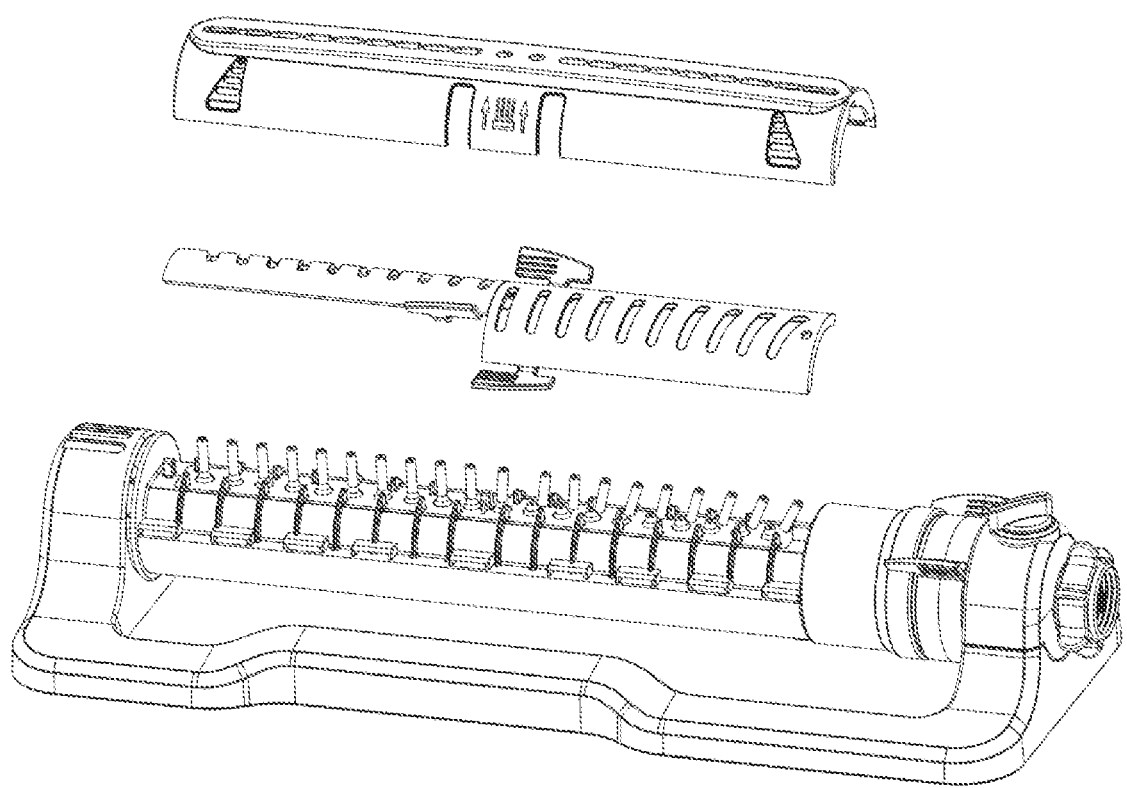
FIG. 9C shows a perspective exploded view of a sprinkler according to another embodiment.

FIG. 9C shows a perspective exploded view of a sprinkler 1 (10) according to one embodiment. The sprinkler 10 shown in FIG. 3 may be designed with pivot plate 9A shown in FIG. 9C. The pivot plate 9A is similar to the pivot plate 9, but comprises left side pivot plate 9L and right side pivot plate 9R, which are separate from each other to allow for independent rotation and left side adjustment tab 19L and right side adjustment tab 19R, each of which can be formed in the manner described above regarding adjustment tab 19.

As described above, the cover 11 is attached to the housing 5 and has a circular cover outlet 22 corresponding to each fixed vertical nozzle $N_f$ in the sprinkler 1, a plurality of rectangular cover grooves 24 that are substantially parallel to the longitudinal axis of the sprinkler 1, and cover slots 21L and 21R associated with each adjusting tab 19L and 19R.

The cover 11 includes at least one gauge window 210 designed to expose at least a portion of one of the pivot plate 9, the left side pivot plate 9L and/or the right side pivot plate 9R plate positioned underneath the cover 11. The gauge window 210 shown in FIGS. 1A-1G, 2A-2G, 3, and 9C is formed in the shape of a viewing window for easily determining the spray position(s) of the sprinkler in both on and off conditions. In this embodiment, the viewing window is a triangular shaped opening formed by a plurality of generally vertically aligned linear cutouts (e.g., progressively longer linear cutouts from top to bottom direction). The optimal position and/or size of the viewing window is determined based on the pivot late 9 design and such that it is visible from both vertical and horizontal viewing directions. The linear cutouts function as a position indicator of the nozzles.

Figure 3:
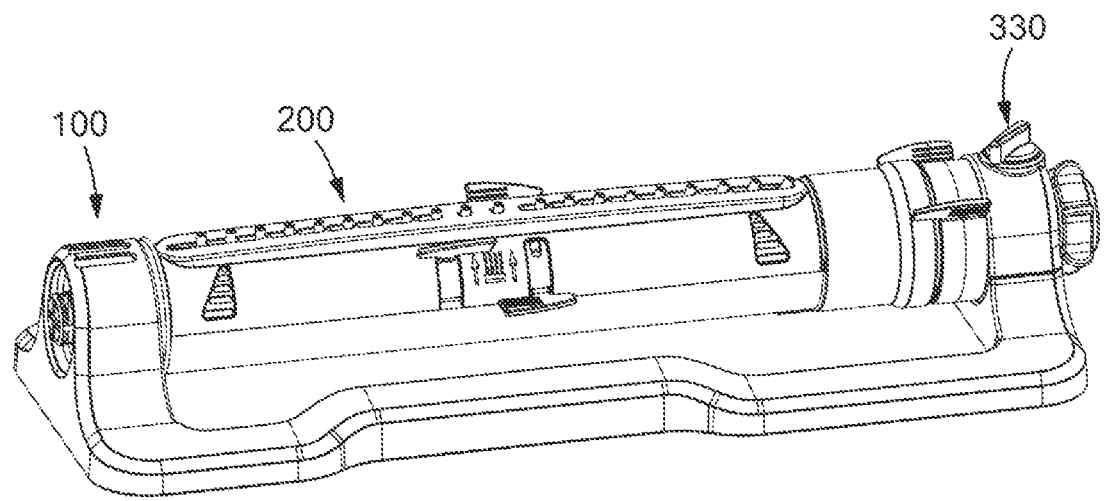
FIG. 3 is a perspective view of a sprinkler according to another embodiment from an upper left front side of the sprinkler.

For example, as shown in FIG. 3, gauge window 210R displays all yellow (if the color of the pivot plate 9R is yellow) because the adjustment tab 19R is manipulated for widest spray width pattern. Whereas, for example, only the top line of gauge window 210L is yellow (if the color of the pivot plate 9L is yellow) because the adjustment tab 19L is manipulated for generally upright spray pattern. As described above, the travel of the adjusting tab 19 determines a displacement of the pivot plate 9, which determines the amount of the pivot plate 9 that is exposed and viewable to an outside of the cover via the position indicator opening 28. The same general design principle applies to sprinklers designed with a single adjustment tab or multiple adjustment tabs.

Figure 4:
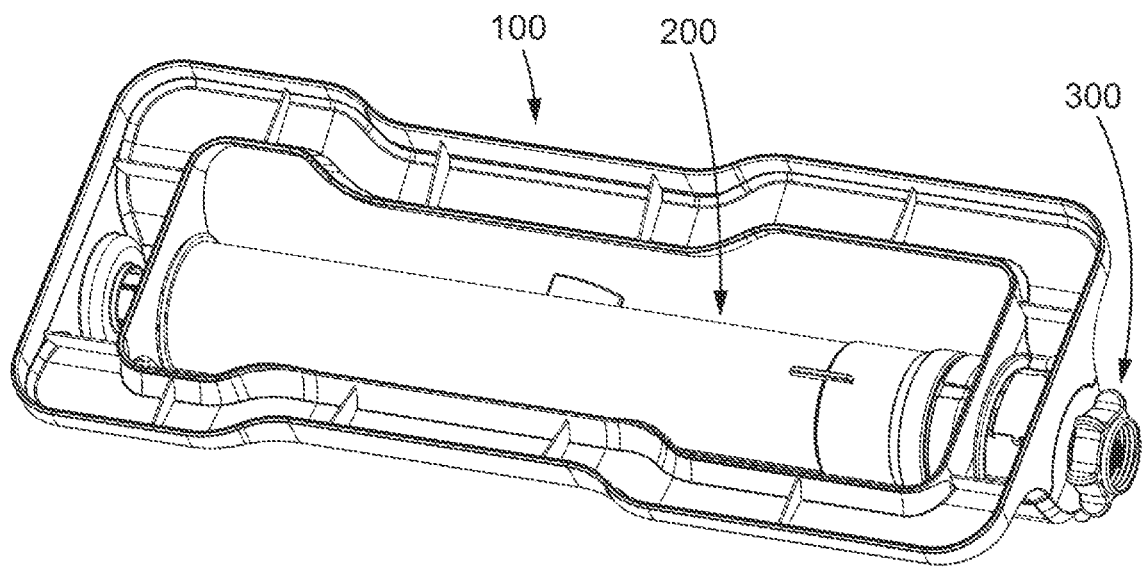
FIG. 4 is a bottom perspective view of the sprinkler shown in FIG. 3 from a lower right front side of the sprinkler shown in FIG. 3.

FIG. 4 shows one embodiment of a bottom perspective view of the sprinkler shown in FIG. 3 from a lower right front side of the sprinkler shown in FIG. 3. In this figure, a bottom side of the base portion 100, the tubular portion 200 and the water inlet portion 300 are shown.

As shown in FIGS. 10A-10D, the pivot plate 9 (same design may also apply to pivot plates designed for multiple adjustment mechanisms, e.g., shown in FIG. 9C) includes pivot plate grooves 17 having angled sidewalls 25 formed therein. One reason the sidewalls 25 of the pivot plate grooves 17 are formed with an angle is so that when variable nozzles $N_v$ are moved, the axis of each of the variable nozzles remains substantially parallel to the portion of the sidewall of respective pivot plate groove 17 that is in contact with the variable nozzle N.

The degree of the angle of the sidewall 25 progressively increases along the length of the groove (discussed below). This allows a greater surface area of the sidewall to contact the flexible variable nozzle $N_v$ which helps to prevent the variable nozzles $N_v$, from being squeezed or pinched by the sidewalls of the pivot plate grooves 17. It also increases the life expectancy of the nozzles by reducing wear that may be caused by the pivot plate grooves 17 contacting the variable nozzles N.

Figure 10A:
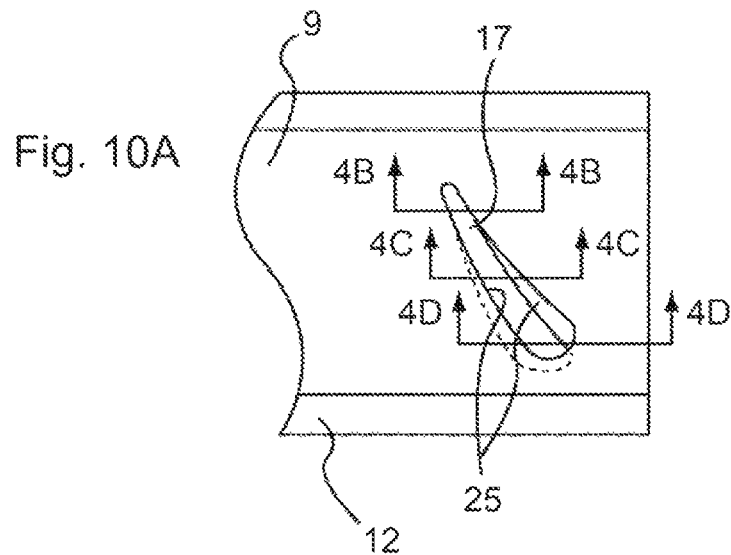
FIG. 10A shows one embodiment of a sectional view of a sidewall of a groove of a pivot plate from a bottom perspective.
Figure 10B:
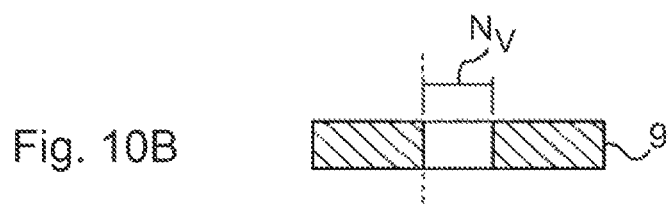
FIGS. 10B, 10C, and 10D show progressively increasing angles of the sidewall of the groove shown in FIG. 10A.
Figure 10C:
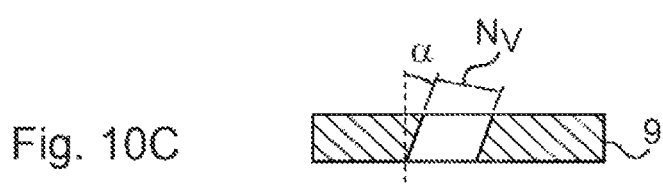
Figure 10D:
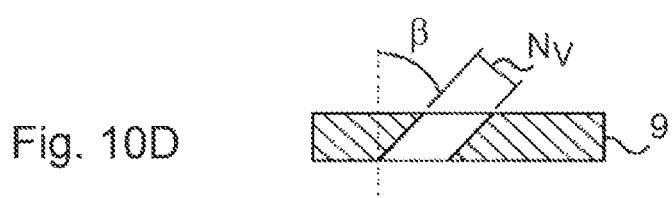

FIG. 10A shows a groove 17 from the bottom perspective. As shown in FIGS. 10B-10D, the angle of sidewall 25 increases. As seen from figures, $\alpha_1 < \alpha_2 < \alpha_3$. Variable nozzle $N_v$, is progressively titled outward as sidewall 25 contacts and moves the variable nozzle. As pivot plate 9 is pivoted, the angle of sidewall 25 remains substantially parallel to the tubular part of variable nozzle $N_v$.

Figure 11:
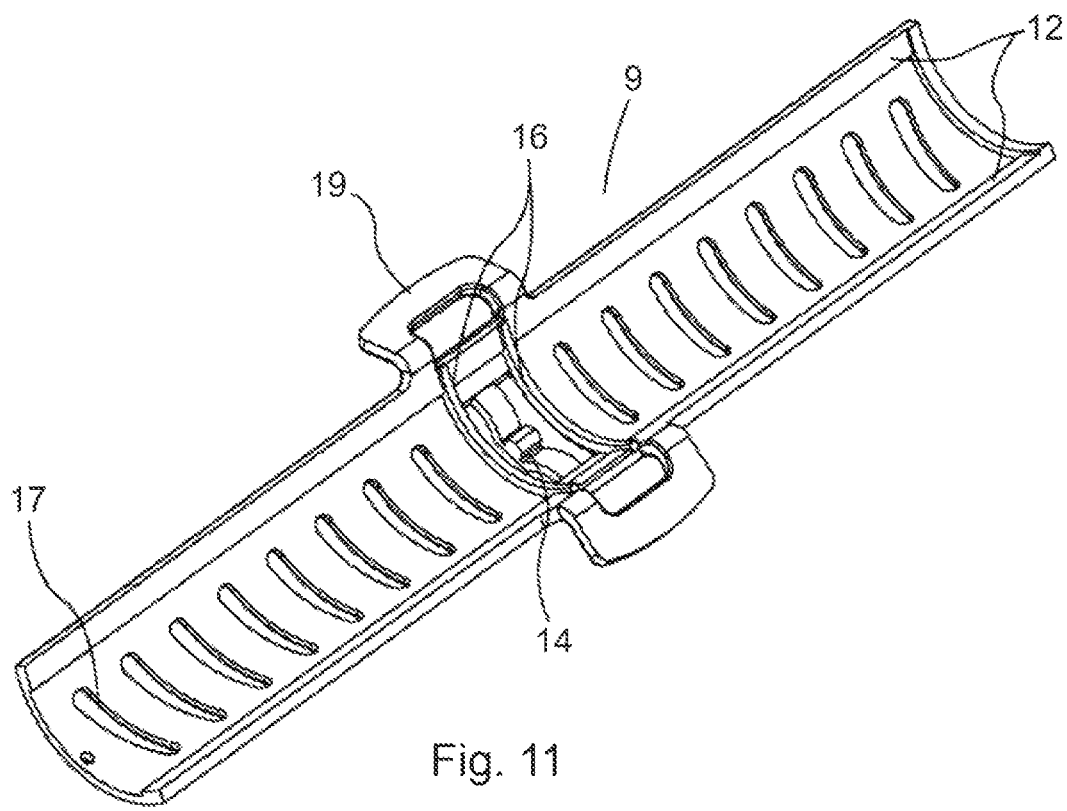
FIG. 11 shows a bottom view of the pivot plate of the sprinkler of FIG. 9A, according to one embodiment.

As shown in FIG. 11, the pivot plate 9 includes at least one internal rib 16 (preferably two), provided on a bottom (or underside) of the pivot plate 9. The internal rib(s) 16 enable the pivot plate to slide along the tubular housing 5 itself. The internal ribs 16 also serve to substantially fix pivot plate 9 in place with respect to any longitudinal movement about tubular housing 5 by contacting the side surface of elevated ribs 6 provided on the tubular housing 5.

Figure 12:
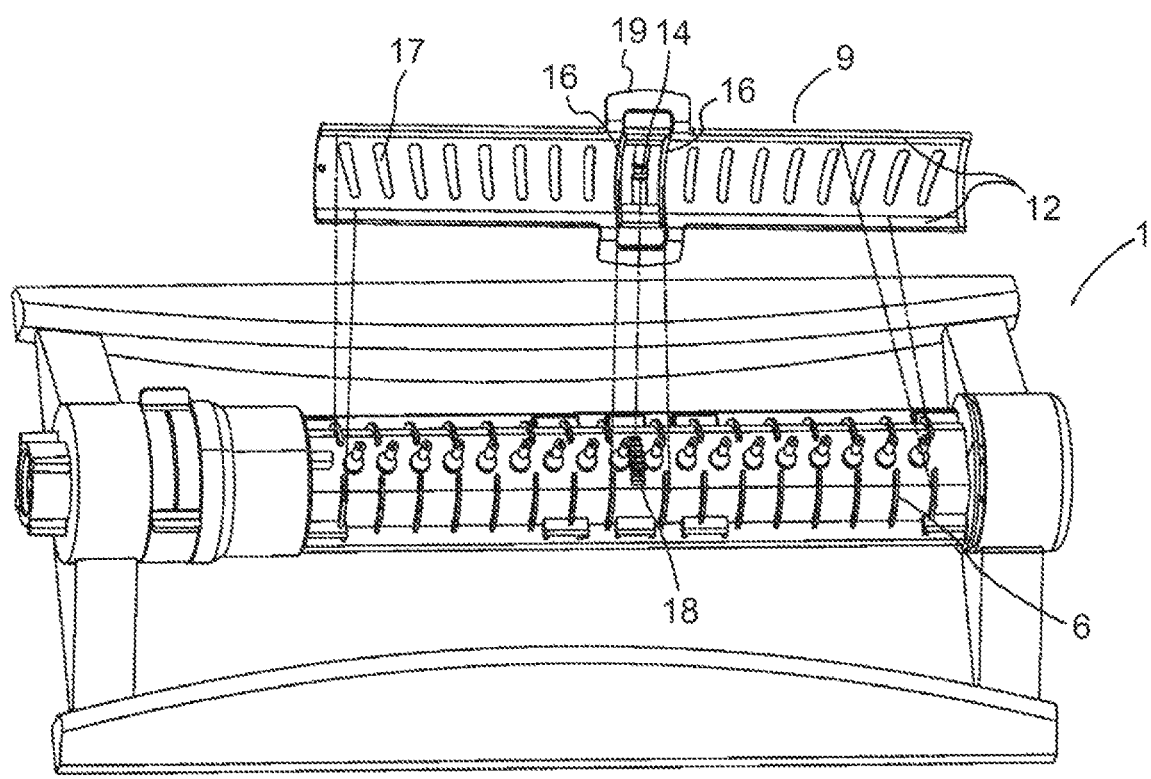
FIG. 12 shows a perspective exploded view of the pivot plate and tubular housing of FIG. 9A, according to one embodiment.

The pivot plate 9 may also have at least one elevated rail 12 located on one or both sides of the longitudinal axis of pivot plate 9 as shown in FIG. 11 (also shown in FIG. 12). The elevated rail(s) 12 contacts the top surface of elevated ribs 6 of the tubular housing 5. This allows pivot plate 9 to move more easily over the tubular housing 5 and elevated ribs 6 of the tubular housing 5.

Wedge 14 is shown formed on an underside of the pivot plate 9 and designed to cooperatively engage a plurality of notches 18 provided on the housing 5. The wedge 14 and notches 18 enable the user to adjust the position of the pivot plate 9 to one of several positions by actuating the adjusting tab 19. As the user adjusts the tab 19, the wedge 14 is moved over and into the notches 18 located on the housing 5. According to this design, for example, a lateral force is all that is needed for the wedge 14 to be moved to a different position.

As shown in FIG. 12, two internal ribs 16 of the pivot plate 9 fit in between the two elevated ribs 6 of the tubular housing 5. A side surface of the two internal ribs 16 contact (or come into close proximity) the side surface of the elevated ribs 6. The housing 5 may also contain a notch-shaped element 18. This element is designed to be used with the wedge 14. As the wedge 14 is moved via the adjusting tab 19, it is positioned into different notches of the notch-shaped element 18. This enables a user to set a precise position of the adjusting tab and to also set a precise, repeatable, and pre-determined spray pattern of the sprinkler 1.

As shown in FIGS. 13A, 13B and 13C, each variable nozzle $N_v$ has an inlet 8a and an outlet 8b (following a substantially cylindrical portion), wherein the outlet 8b passes through pivot plate grooves 17 of pivot plate 9. As described above, the variable nozzles $N_v$ may be rubber-like so that the nozzle outlets 8b can be tilted or bent in a desired position.

FIG. 14 shows an assembled view of three different settings of the adjusting tab 19 of the sprinkler 1, according to one embodiment. In the first setting (top) adjusting tab 19 is not adjusted. As a result, variable nozzles $N_v$ point in a substantially vertical direction. In the second setting (middle) the adjustable element 19 is partially adjusted. As a result, the variable nozzles $N_v$ point in a somewhat outwardly direction. As the nozzles N are positioned further away from the center of pivot plate 9, they become increasingly angled with respect to the center fixed nozzles $N_f$. In the third setting (bottom) the adjustable tab 19 is fully adjusted. As a result, the variable nozzles $N_v$ are fully tilted outward, and the sprinkling pattern is set to its maximum coverage. The same operating and design principles apply to sprinklers having the pivot plate 9 design shown in FIG. 9C.

Figure 15A:
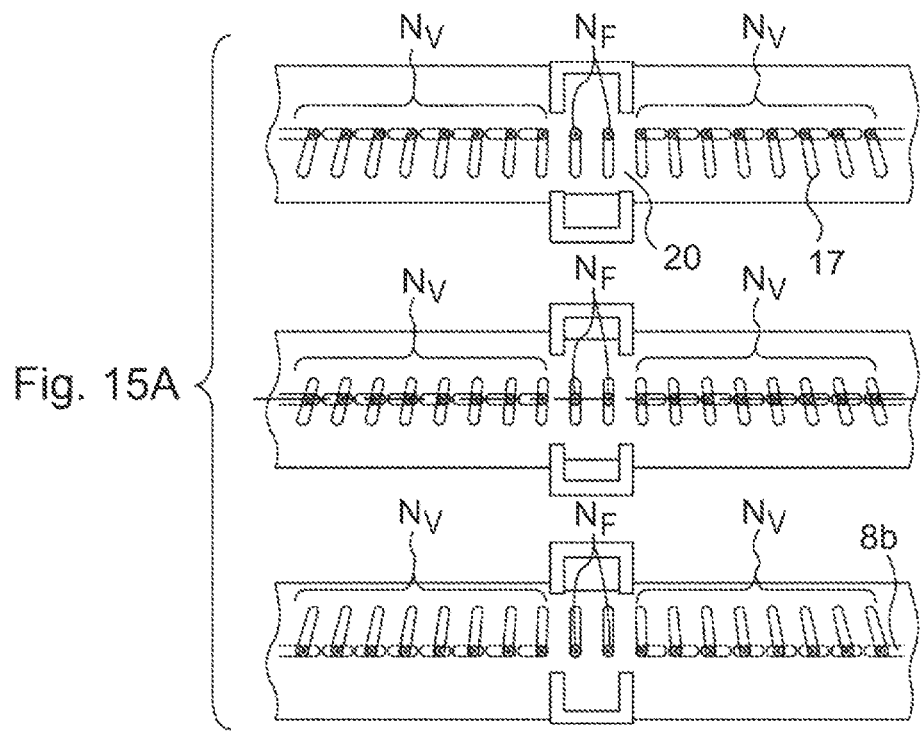
FIG. 15A shows a sectional view of one embodiment of a pivot plate in three different setting positions.
Figure 15B:
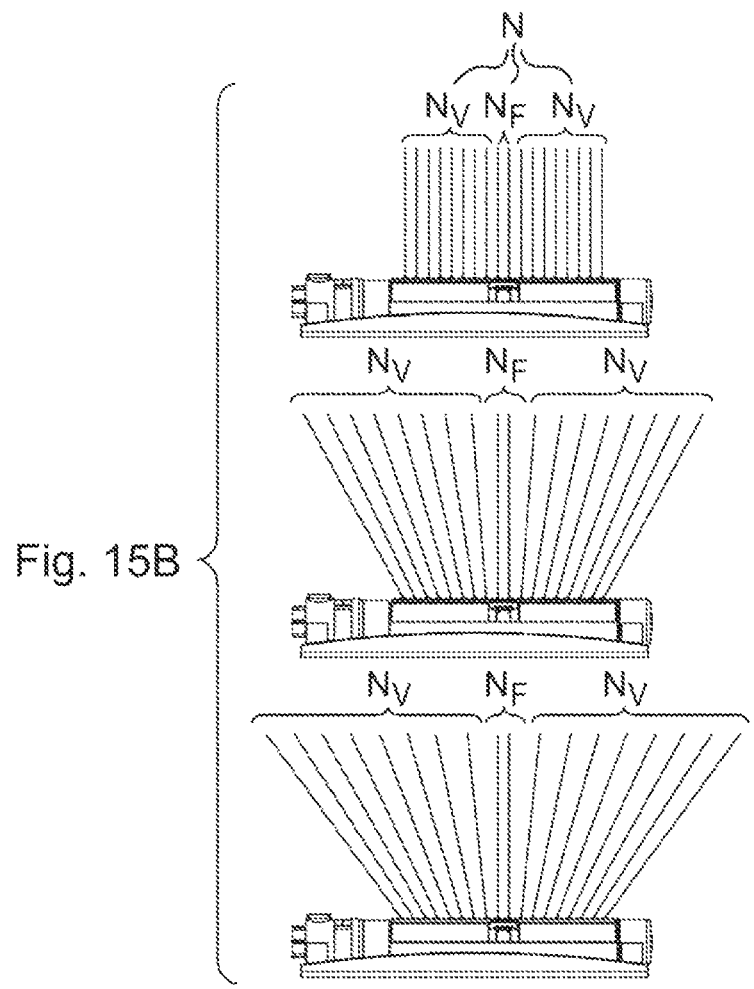
FIG. 15B shows the spray pattern corresponding to each of the three different setting positions of FIG. 15A.

FIG. 15A and FIG. 15B show the angle of fixed nozzles $N_f$, the angle of the variable nozzles $N_v$, as well as the corresponding sprinkling pattern, respectively. As shown in FIG. 15B, the inner variable nozzles $N_v$ tilt less than the outer variable nozzles $N_v$ so that a uniform sprinkling pattern (e.g. fan-like) may be achieved. As shown in FIG. 15B, fixed nozzles $N_f$ always point in a fixed direction, in this case a substantially vertical direction.

FIG. 16 shows another embodiment of the present invention. In FIG. 16, four fixed nozzles $N_f$ are located at the center of the sprinkler 1. The inner two fixed nozzles $N_f$ point in a substantially vertical direction, approximately 90° perpendicular to the surface of cover 11. The inner two fixed nozzles $N_f$ protrude through substantially vertical circular cover outlet 22. The outer two fixed nozzles $N_{ft}$ are fixed in a tilted outward position. The three drawings of FIG. 16 show the different angles of the variable nozzles $N_v$ as adjusting tab 19 is being adjusted, similar to that shown in FIG. 14.

A plurality of nozzles adjacent to both sides of the fixed vertical nozzle(s) $N_f$ may be fixed in a desired tilted position $N_{ft}$, (e.g., less than 90° from the longitudinal axis) by the predetermined desired position of angled cover outlets 23 of the cover 11. This structure is designed to deliver a predetermined vertical and fan-like projection of fluid. The remaining nozzles in this arrangement are variable $N_v$ and may be adjustably tilted outward (described above) so that variable nozzles $N_v$ deliver a selectively outward tilted projection of fluid.

Figure 17A:
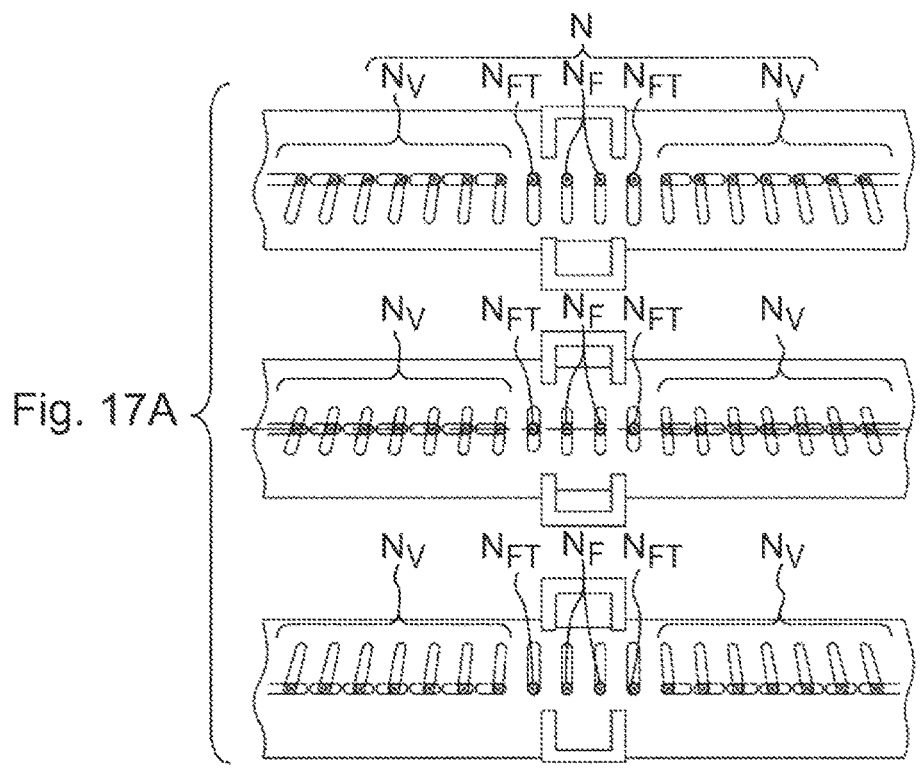
FIG. 17A shows a sectional view of a pivot plate in three different settings positions according to the embodiment shown in FIG. 16.
Figure 17B:
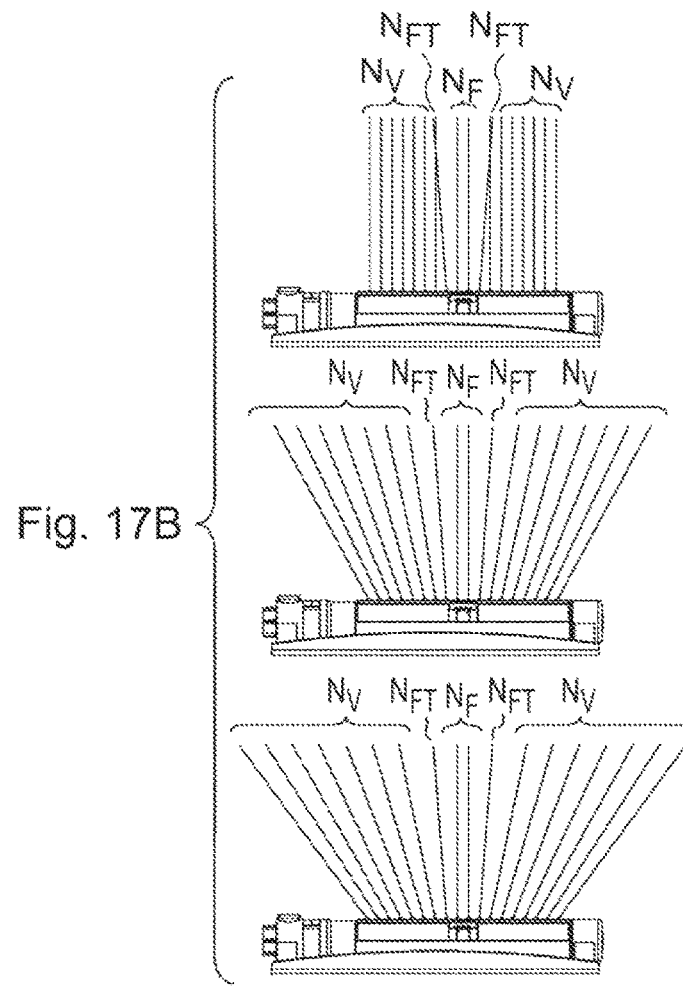
FIG. 17B shows the spray pattern corresponding to each of the three different setting positions of FIG. 17A.

FIG. 17A and FIG. 17B show the angle of the fixed nozzles $N_f$ and the angle of the variable nozzles $N_v$ according to the embodiment shown in FIG. 16 (e.g., having inner two fixed nozzles and outer two fixed nozzles), as well as the corresponding sprinkling pattern, respectively. As shown in FIG. 17A, the inner variable nozzles $N_v$ tilt less than the outer variable nozzles $N_v$ so that a uniform sprinkling pattern may be achieved. As shown in FIG. 17B, the fixed nozzles $N_f$ always point in a fixed direction, in this case the inner fixed nozzles point in a substantially vertical direction, while the outer fixed nozzles $N_{ft}$ point in a tilted direction.

Figure 18A:
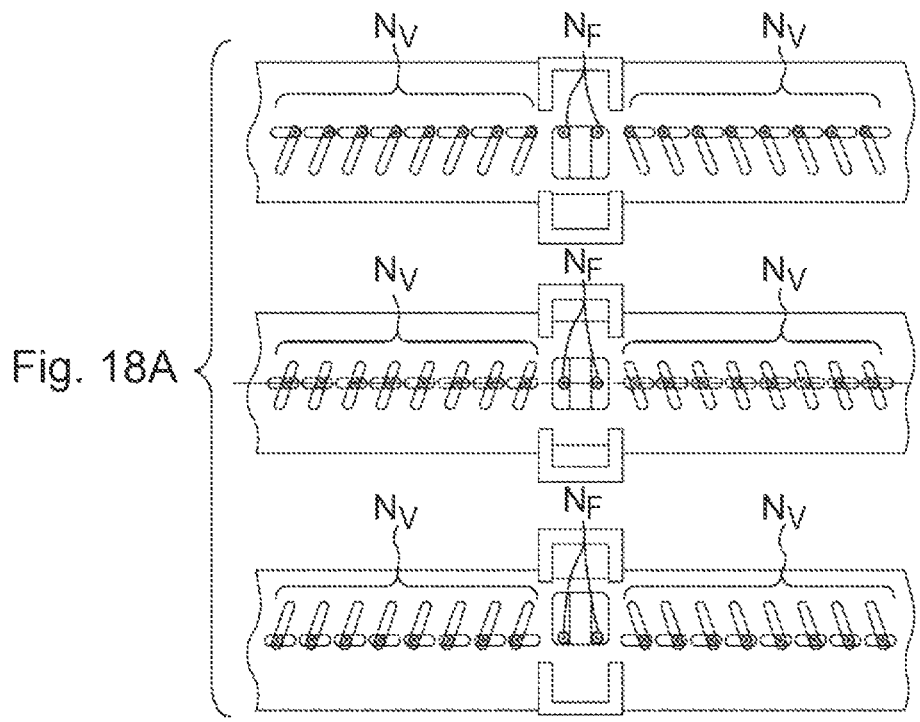
FIG. 18A shows a sectional view of one embodiment of a pivot plate in three different setting positions.
Figure 18B:
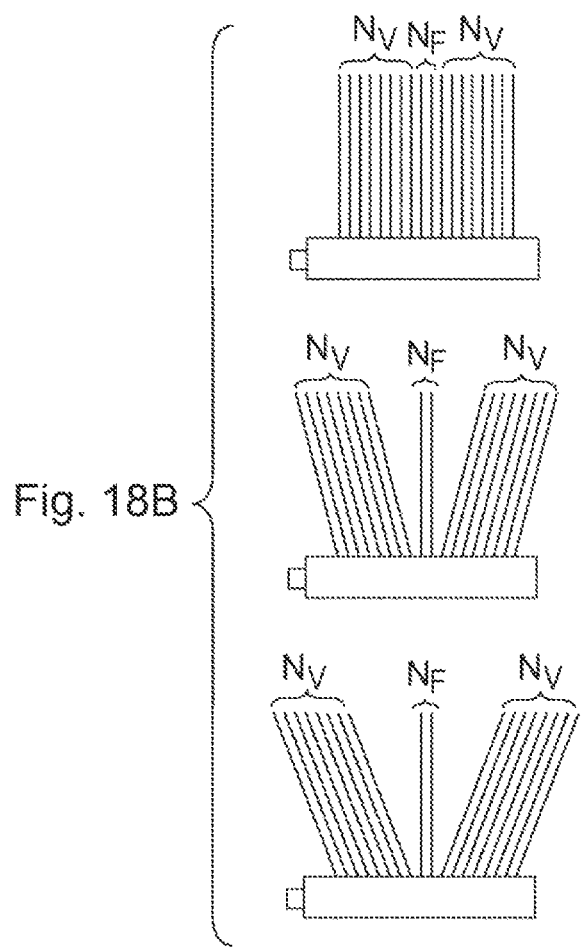
FIG. 18B shows the spray pattern corresponding to each of the three different setting positions of FIG. 18A.

In another embodiment, FIG. 18A and FIG. 18B show the angle of fixed nozzles $N_f$, the angle of the variable nozzles $N_v$ as well as the corresponding sprinkling pattern, respectively. As shown in FIG. 18B, the inner variable nozzles $N_v$ move the same amount as the outer variable nozzles $N_v$. Thus, the variable nozzles $N_v$ do not move relative to each other. As shown in FIG. 18B, the fixed nozzles $N_f$ always point in a fixed direction, in this case in a substantially vertical direction. As variable nozzles $N_v$ do not move relative to one another, the streams of fluid from the variable nozzles leave the sprinkler parallel to each other.

Figure 19:
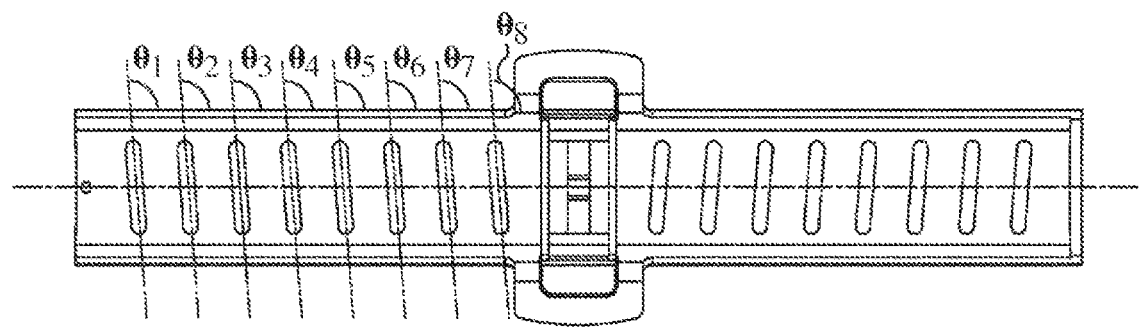
FIG. 19 shows the angle of the grooves formed in the pivot plate of FIG. 18, according to one embodiment.

As shown in FIG. 19, the pivot plate grooves 17 are set at a predetermined fixed angle θ. With each pivot plate groove set at the same angle relative to the longitudinal axis of the pivot plate 9, each of the variable nozzles $N_v$ move parallel to each other and thus do not move relative to one another.

While illustrative embodiments of the invention have been described herein, the present invention is not limited to the various preferred embodiments described herein, but includes embodiments having equivalent elements, modifications, omissions, combinations (e.g., of aspects across various embodiments), adaptations and/or alterations as would be appreciated by those in the art based on the present disclosure.

The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure.

The language present invention or invention should not be improperly interpreted as an identification of criticality, should not be improperly interpreted as applying across all aspects or embodiments (it is understood that the present invention has a number of aspects and embodiments), and should not be improperly interpreted as limiting the scope of the application or claims.

In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

We claim:

1. A sprinkler apparatus comprising:
a frame;
a generally tubular shaped housing attached to the frame;
a nozzle strip positioned inside the tubular shaped housing, the nozzle strip comprising a plurality of flexible nozzles, the flexible nozzles normally positioned in upward direction;
a cam plate positioned inside the housing, the cam plate comprising a plurality of cam slots configured to engage with and thereby adjust the position of at least some of the plurality of flexible nozzles upon rotation of the cam plate within the housing;
an adjustment tab attached to the cam plate and extending away from said sprinkler apparatus; and
a gauge window formed in the housing, wherein
the gauge window is configured to expose a portion of the cam plate such as to designate an extent of angular displacement of the flexible nozzles based on a position of the cam plate viewable through the gauge window,
the adjustment tab is laterally spaced apart from the gauge window such that no portion of the adjustment tab is exposed from the gauge window, and
the cam plate is configured to rotate around a central axis of the generally tubular shaped housing.

2. The sprinkler apparatus of claim 1, wherein the gauge window is tapered or triangular shaped.

3. The sprinkler apparatus of claim 2, wherein the gauge window is narrowest at an upper end of the gauge window and widest at a lower end of the gauge window.

4. The sprinkler apparatus of claim 1, wherein an upper end of the gauge window extends higher than a lower end of said cam slots during rotation of the cam plate.

5. The sprinkler apparatus of claim 4, wherein at least an upper end of the gauge window is located entirely between adjacent cam slots such that the cam slots do not extend behind the gauge window during rotation of the cam plate.

6. The sprinkler apparatus of claim 1, wherein the gauge window comprises a plurality of adjacent slits.

7. The sprinkler apparatus of claim 6, wherein the gauge window comprises 3 to 12 adjacent slits.

8. The oscillating sprinkler system of claim 6, wherein the gauge window comprises 4 to 8 adjacent slits.

9. The sprinkler apparatus of claim 1, wherein the rotational position of the cam plate can be adjusted in opposite rotational directions by applying a downward force on the adjustment tab.

10. The sprinkler apparatus of claim 1, wherein
the cam plate comprises a first cam plate and a second cam plate, and the first cam plate is rotatable independent from the second cam plate,
the gauge window comprises a first gauge window and a second gauge window,
the first gauge window is configured to expose a portion of the first cam plate such as to designate an extent of angular displacement of the flexible nozzles based on a position of the first cam plate viewable through the first gauge window, and
the second gauge window is configured to expose a portion of the second cam plate such as to designate an extent of angular displacement of the flexible nozzles based on a position of the second cam plate viewable through the second gauge window.

11. The sprinkler apparatus of claim 10, wherein
the nozzle strip comprises a first set of nozzles and a second set of nozzles,
the first cam plate is arranged to adjust the position of the first set of nozzles,
the second cam plate is arranged to adjust the position of the second set of nozzles, and
the first cam plate is arranged adjacent to the second cam plate in a longitudinal direction of the sprinkler.

12. The sprinkler apparatus of claim 11, wherein
the first cam plate comprises a first adjustment tab, whereby the rotational position of the first cam plate can be adjusted in opposite rotational directions by applying a downward force on the first adjustment tab, and
the second cam plate comprises a second adjustment tab, whereby the rotational position of the second cam plate can be adjusted in opposite rotational directions by applying a downward force on the second adjustment tab.

13. The sprinkler apparatus of claim 1, wherein
the gauge window is configured such that the cam slot adjacent to the gauge window does not extend within the gauge window at any position of the rotational movement of the cam plate.

14. The sprinkler apparatus of claim 1, wherein an upper portion of the gauge window is configured such as to be narrower than a distance between the cam slots positioned adjacent to the gauge window, and such as to extend in between the adjacent cam slots when the cam plate is fully extended across the gauge window.

15. The sprinkler apparatus of claim 1, wherein
the housing comprises a cover portion, the cover portion comprising a plurality of openings,
the cam plate is an elongated curved plate comprising an adjustment element, and the cam plate is configured to pivot or tilt in a circumferential direction relative to the cover portion, the cover portion being fixed to the housing, and
a first nozzle of the plurality of flexible nozzles extends outside the sprinkler apparatus via a first cam slot of the plurality of cam slots and a first opening of the plurality of opening on the cover.

16. The sprinkler apparatus of claim 1, wherein the gauge window is formed on an arcuate side surface of the housing such that a lower portion of the gauge window is formed on a lower portion of the arcuate side surface.

* * * * *